(12) United States Patent
Mancebo del Castillo Pagola

(10) Patent No.: US 7,847,433 B2
(45) Date of Patent: Dec. 7, 2010

(54) UNIVERSAL IRRIGATION CONTROLLER POWER SUPPLY

(75) Inventor: Fausto F. Mancebo del Castillo Pagola, Tijuana (MX)

(73) Assignee: Rain Bird Corporation, Azusa, CA (US)

( * ) Notice: Subject to any disclaimer, the term of this patent is extended or adjusted under 35 U.S.C. 154(b) by 399 days.

(21) Appl. No.: 11/945,937

(22) Filed: Nov. 27, 2007

(65) Prior Publication Data
US 2009/0135629 A1 May 28, 2009

(51) Int. Cl.
*H02J 7/00* (2006.01)
(52) U.S. Cl. .......................................... 307/64; 363/37
(58) Field of Classification Search ................... 363/72, 363/74, 95–98, 55, 134, 81, 89, 37; 307/46, 307/48, 141, 64, 66; 323/906, 907
See application file for complete search history.

(56) References Cited

U.S. PATENT DOCUMENTS

| | | | |
|---|---|---|---|
| 3,599,867 A | 8/1971 | Griswold et al. | |
| 4,178,556 A | 12/1979 | Attwood | |
| 4,190,884 A | 2/1980 | Medina | |
| 4,349,703 A | 9/1982 | Chea, Jr. | |
| 4,349,704 A | 9/1982 | Gillis | |
| 4,433,368 A * | 2/1984 | Choi | 363/45 |
| 4,656,659 A | 4/1987 | Chea, Jr. | |
| 4,725,740 A | 2/1988 | Nakata | |
| 4,796,654 A | 1/1989 | Simpson | |
| 4,852,051 A | 7/1989 | Mylne, III | |
| 4,922,433 A | 5/1990 | Mark | |
| 4,943,917 A | 7/1990 | Mylne, III | |
| 4,951,204 A | 8/1990 | Mylne, III | |
| 4,980,574 A * | 12/1990 | Cirrito | 307/21 |
| 5,260,996 A | 11/1993 | Dillon et al. | |
| 5,293,554 A | 3/1994 | Nicholson | |
| 5,398,003 A | 3/1995 | Heyl et al. | |
| 6,005,377 A | 12/1999 | Chen et al. | |
| 6,016,075 A | 1/2000 | Hamo | |
| 6,049,471 A | 4/2000 | Korcharz et al. | |
| 6,072,362 A | 6/2000 | Lincoln | |
| 6,104,248 A | 8/2000 | Carver | |
| 6,118,336 A | 9/2000 | Pullen et al. | |
| 6,140,875 A | 10/2000 | Van Den Homberg et al. | |

(Continued)

OTHER PUBLICATIONS

Honda et al., *How Class D Audio Amplifiers Work*, Audio DesignLine, Jan. 23, 2006, pp. 1-11, http://www.audiodesignline.com/howto/177102531, CMP Media LLC, USA.

(Continued)

*Primary Examiner*—Rajnikant B Patel
(74) *Attorney, Agent, or Firm*—Fitch Even Tabin & Flannery

(57) ABSTRACT

Described herein are systems, methods and apparatuses for providing power to an irrigation controller. In one implementation, an apparatus comprises an alternating current (AC) to direct current (DC) voltage converter configured to convert an input AC voltage into a DC voltage. An AC voltage generator is coupled to the AC to DC voltage converter, wherein the AC voltage generator is configured to generate an output AC voltage using the DC voltage. The AC voltage generator is further coupled to the irrigation controller, and the AC voltage generator is configured to supply the output AC voltage to the irrigation controller.

39 Claims, 14 Drawing Sheets

U.S. PATENT DOCUMENTS

| | | |
|---|---|---|
| 6,396,722 B2 | 5/2002 | Lin |
| 6,519,168 B2 | 2/2003 | Jain et al. |
| 6,597,159 B2 | 7/2003 | Yang |
| 6,697,685 B1 | 2/2004 | Caldwell |
| 6,703,796 B2 | 3/2004 | Che-Chen et al. |
| 6,803,816 B2 | 10/2004 | Putzeys |
| 6,944,034 B1 | 9/2005 | Shteynberg et al. |
| 6,972,969 B1 | 12/2005 | Shteynberg et al. |
| 7,015,704 B1 * | 3/2006 | Lang .......................... 324/661 |
| 2002/0008167 A1 | 1/2002 | Haberland et al. |
| 2006/0043208 A1 | 3/2006 | Graham |

OTHER PUBLICATIONS

PCT; App. No. PCT/US08/083454; International Search Report mailed Jun. 29, 2009; 3 pages.

PCT; App. No. PCT/US08/083454; Written Opinion of the International Searching Authority mailed Jun. 29, 2009; 3 pages.

* cited by examiner

UNIVERSAL IRRIGATION CONTROLLER POWER SUPPLY

BACKGROUND OF THE INVENTION

1. Field of the Invention

The present invention relates generally to providing power to irrigation controllers, and more specifically to conversion of input power signals for use by irrigation controllers.

2. Discussion of the Related Art

Irrigation controllers are typically used to control and actuate valves controlling the flow of water therethrough. Irrigation controllers are often required to be connected to an alternating current (AC) power source. Such controllers often use an input AC power signal at least to generate an output AC power signal used in actuating the valves. For example, a 110/120 or 220/240 volts AC (VAC) (herein generally referred to as 120 and 240 VAC respectively) input AC voltage source is traditionally stepped down or converted into a 24 VAC supply using a conventional step-down transformer. The 24 VAC supply provides suitable power for actuating the various valves controlled by the irrigation controller.

However, there are a number of issues in using the above described step-down power supply. The step-down transformer is constructed to step-down the voltage level of the input voltage (e.g., a primary voltage) to produce a voltage at the output of the transformer (e.g., a secondary voltage). Thus, a first problem with the step-down transformer power supply is that when the voltage level of the power source varies, the input voltage varies, and the step-down transformer produces the output voltage to follow the input voltage. Therefore, the output voltage level will vary in proportion to the input voltage level. This can result in too much or too little operating voltage at the valve solenoid.

Additionally, such transformers used in step-down power supplies must be designed to accommodate for such variations and are typically not very efficient. In some embodiments, these transformers cause excessive heat under load and significant power consumption due to core losses, even when no valves are operating. It is noted that recent governmental regulations are beginning to mandate higher requirements for "standby" power efficiency. These regulations are hard to meet with a conventional step-down transformer.

Another issue with conventional step-down power supplies is that the transformers used are both heavy and expensive. This weight results in added shipping costs and thicker support components. A big additional cost is incurred by the company for the engineering time and activities needed to select and certify new suppliers. Additionally, continuous growth in the global prices for copper increases power transformers' prices. For example, it is believed that over 50% of a transformer's price is derived from copper material costs. This situation hinders long term estimations of cost reductions and future part consolidation programs.

Finally, in order to accommodate the different electrical standards (e.g., 120 and 240 VAC), found in different countries, several different versions of the traditional step-down power supplies and irrigation controllers must be produced using different types of transformers. For example, the transformers must be able to handle the specific voltage (e.g., 120 or 240 VAC) and the specific frequency (e.g., 50 or 60 Hz), as well as normal variations thereof, of the country in which the controller will be used.

SUMMARY OF THE INVENTION

Several embodiments of the invention advantageously address the needs above as well as other needs by providing methods, systems and apparatuses for providing power for use by an irrigation controller.

In one embodiment, an apparatus is presented comprising an alternating current (AC) to direct current (DC) voltage converter configured to convert an input AC voltage into a DC voltage. An AC voltage generator is coupled to the AC to DC voltage converter, and the AC voltage generator is configured to generate an output AC voltage using the DC voltage. The AC voltage generator is coupled to the irrigation controller, and the AC voltage generator is further configured to supply the output AC voltage to the irrigation controller.

In another embodiment, a method for powering an irrigation controller is presented comprising converting an input alternating current (AC) voltage signal into a direct current (DC) voltage signal and generating an output AC voltage signal using the DC voltage signal. The output voltage signal is configured to power the irrigation controller and the output AC voltage signal is supplied to the irrigation controller.

In yet another embodiment, a power supply comprises an input configured to receive an input alternating current (AC) voltage ranging from 85 volts AC to 260 volts AC. The power supply includes an output configured to couple to an irrigation device, and a circuit to generate an output AC voltage. The output AC voltage powers the irrigation device and the output AC voltage is substantially constant regardless of whether the input AC voltage varies in at least one of frequency and voltage.

In yet another embodiment, a method is presented comprising receiving an input alternating current (AC) voltage having a voltage level ranging between 85 to 260 volts AC and generating, based at least in part on the input AC voltage, a substantially constant output AC voltage configured to be used by an irrigation controller regardless of whether the input AC voltage varies in at least one of frequency and voltage.

In yet another embodiment, an irrigation controller power supply is presented, comprising an input adapted to receive an alternating current (AC) signal. The power supply further comprises an AC to direct current (DC) converter coupled to the input, wherein the AC to DC converter is adapted to output a DC signal derived from the AC signal. An AC generator adapted to generate an output AC signal using the DC signal is provided and a control output is coupled to the AC generator, wherein the control output is adapted to couple to an irrigation control device. The control output is further adapted to drive the irrigation control device with the output AC signal.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
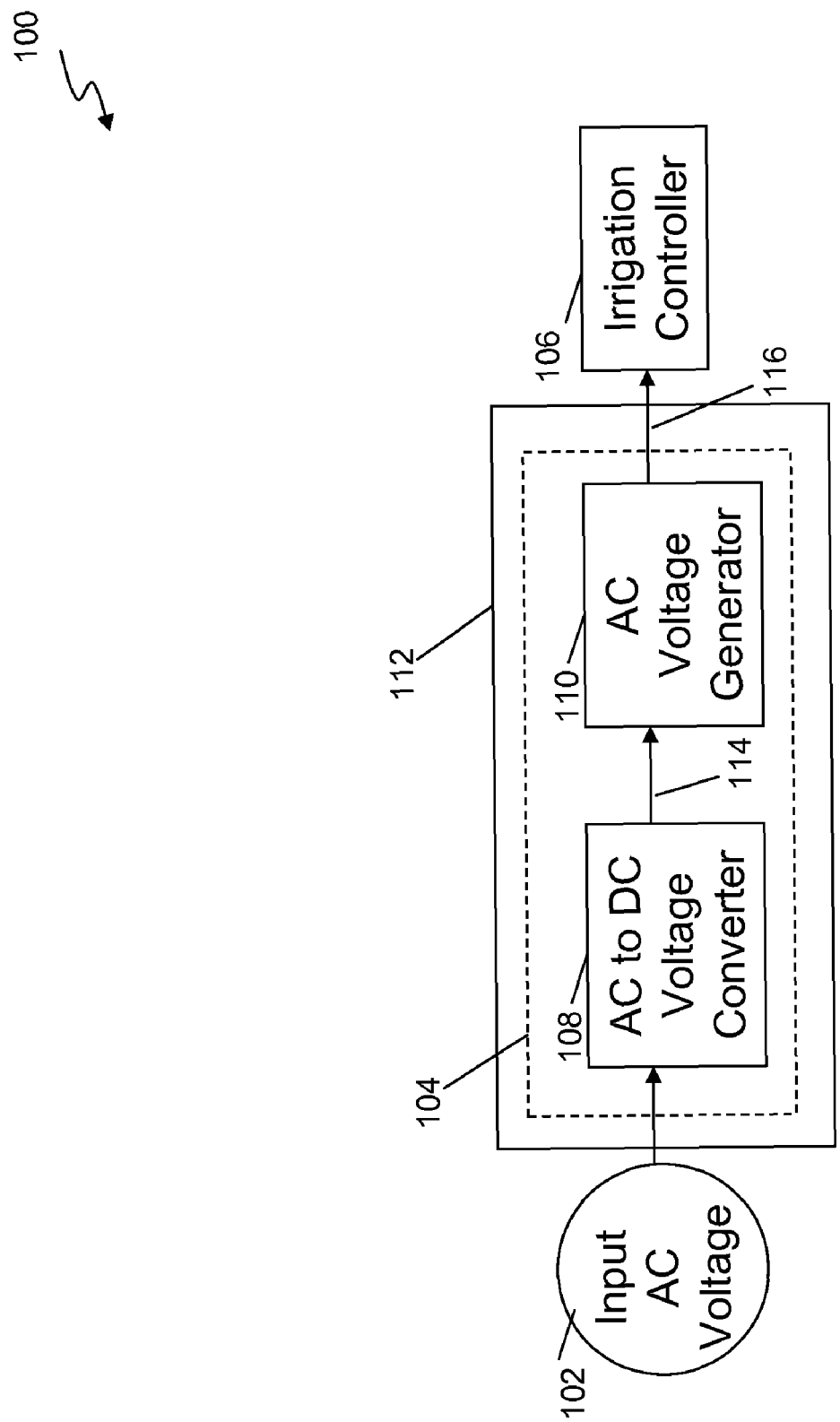
FIG. 1 is a block diagram of a power supply for providing power for use by an irrigation controller according to one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Several embodiments of present invention set forth an apparatus, system and method for use by an irrigation device. In a specific embodiment, an apparatus, system and method are provided for converting an alternating current (AC) voltage ranging from 85 to 260 volts AC into a direct current (DC) voltage, wherein the DC voltage is used to create an AC voltage adapted for use by an irrigation control device.

Referring first to FIG. 1, a block diagram of a power supply for providing power for use by an irrigation controller according to one embodiment is illustrated. System 100 includes an input AC voltage signal 102, a power supply 104, and an irrigation controller 106. The power supply 104 includes an AC to DC voltage converter 108 coupled to an AC voltage generator 110. It is noted that the AC to DC voltage converter 108 and the AC voltage generator 110 may each be referred to as a circuit or circuitry.

According to several embodiments, a power supply housing 112 encloses the power supply 104. The power supply housing 112 is configured to receive, from an AC power source, the input AC voltage signal 102 for use by the power supply 104. The input AC voltage signal 102 is directed to the AC to DC voltage converter 108 in order to convert the input AC voltage to a DC voltage signal 114. The DC voltage signal 114 is then used by the AC voltage generator 110 to generate an output AC voltage 116.

The power supply housing 112 may comprise metallic terminals wherein an external two or three wire AC power source is coupled to the power supply housing 112, which in turn is directed to the power supply 104. In some embodiments, the AC to DC voltage converter 108 converts the input AC voltage signal 102 by rectifying and filtering the voltage signal to create a substantially constant DC voltage signal 114, e.g. using a switching power supply. The AC voltage generator 110 then generates an output AC voltage 116 using the DC voltage signal 114 to amplify a periodic signal created independent from the input AC voltage. Thus, the power supply 104 is configured to provide power for use by the irrigation controller 106 by receiving an input AC voltage signal 102 and generating, based at least in part on the input AC voltage signal 102, the output AC voltage 116.

In some embodiments, the power supply 104, and thus, the AC to DC voltage converter 108, is configured to receive an input AC voltage signal 102 having a voltage level at least within a predetermined range. By way of example, the AC to DC voltage converter 108 receives any universally available power source comprising the input AC voltage signal 102. According to several embodiments, the AC to DC voltage converter converts the input AC voltage signal 102 into the DC voltage signal 114 regardless of the voltage level of the universally available power source; as long as it is within the predetermined range of, for example, 85 to 260 VAC. Thus, in one form, the power supply 104 may be used universally, and different versions are not needed for different countries.

According to several embodiments, the power supply 104 is configured to convert the input AC voltage signal 102 to substantially the equivalent DC voltage signal 114 for all different voltage levels of the AC power source. Thus, in some embodiments, if the voltage level or frequency of the input AC voltage signal 102 varies over time, the AC to DC voltage converter 108 is configured to continue generating a substantially constant DC voltage signal 114. According to some embodiments, the AC to DC voltage converter is configured to provide a substantially constant DC voltage signal 114 of around 48 V, regardless of the voltage level and frequency, or any variation therein, of the input AC voltage signal 102. In some embodiments, implementing the above described switching type power supply to provide power for use by the irrigation controller, instead of the traditional step-down transformer type power supply, provides benefits such as accepting a universal power source and requiring smaller, less expensive and more efficient components.

Most countries around the world provide electric power configured as one of a plurality of different standards, for example, of 110 VAC or 220 VAC and typically with a frequency of 60 Hz or 50 Hz respectfully. Additionally, the electricity received at a customer's home, for example, may vary from the standard in either voltage and/or frequency.

Thus, in order to address the variations among different country's electricity standards and variations in electricity actually received at the customer's site, the power supply housing 112 is configured, in some embodiments, to receive any universal AC power source. According to several embodiments, the power supply 104 is configured use the universal AC power source, having a voltage level ranging from 85 to 260 VAC and a frequency ranging from below 50 Hz to above 60 Hz, to generate an acceptable output AC voltage 116 (e.g., 24 VAC) for use by the irrigation controller. Furthermore, in one form, the AC voltage generator 110 is further configured to generate the output AC voltage 116 at a substantially constant voltage and a substantially constant frequency, regardless of whether the input AC voltage signal 102 varies in at least one of frequency and voltage level.

According to some embodiments, the input AC voltage signal 102 varies over time and between different sites up to a 20% increase and/or decrease from the standard level. In one embodiment, when the input AC voltage signal 102 varies in voltage level from 85 VAC to 260 VAC and in frequency from 45-75 Hz, the AC voltage generator 110 generates a substantially constant output AC voltage 116, e.g., at 24 VAC and 50 Hz, used by the irrigation controller 106.

In another embodiment, the AC voltage generator 110 uses the DC voltage signal 114, e.g., 48 V, to generate the output AC voltage 116 of 24 VAC at 50 Hz for use by the irrigation controller 106. In some embodiments, the AC voltage generator 110 provides an output AC voltage 116 to the irrigation controller 106 which is used to control one or more water flow control devices, such as, mechanically or electrically actuated valves which control the flow of water to one or more sprinkler devices. For example, many standard water flow control devices operate with 24 VAC. According to some embodiments, the irrigation controller 106 also derives operation power (e.g., DC voltage/current) from the power supply 104.

In some embodiments, the irrigation controller 106 is external to the power supply housing 112 and is supplied the output AC voltage 116 via a wire or a cable. In some embodiments, the irrigation controller 106 is internal to, or also enclosed within, the power supply housing 112. Or, in some embodiments, the power supply 104 is enclosed within a housing of the irrigation controller 106.

Figure 2:
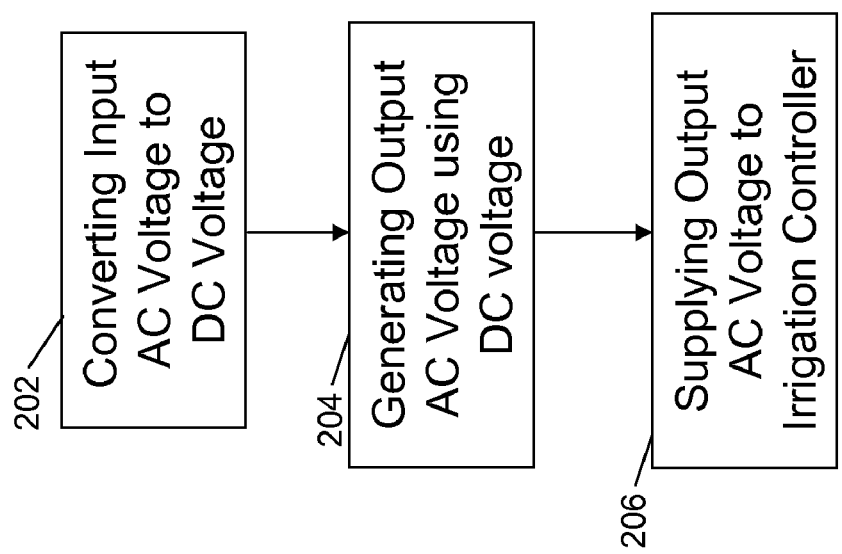
FIG. 2 is a flow diagram of the steps involved in a method for providing power for use by an irrigation controller according to one embodiment.

Referring next to FIG. 2, a flow diagram of the steps involved in a method for providing power used by an irrigation controller according to one embodiment is illustrated. According to several embodiments, method 200 begins by converting an input AC voltage to a DC voltage (step 202). In one embodiment, the conversion is performed by the power supply 104 of FIG. 1, and more specifically the AC to DC voltage converter 108. Next, the method continues with generating an output AC voltage using the DC voltage (step 204). For example, this step is performed by the AC voltage generator 110 of FIG. 1. Next, the method continues with supplying the output AC voltage to the irrigation controller (step 206).

By way of example, the AC to DC voltage converter 108 is configured to filter and rectify the input AC voltage, e.g., of 110 VAC at 60 Hz, for conversion into a DC voltage of 48 V. The DC voltage of 48 V, for example, is then used by the AC voltage generator 110 to amplify a periodic signal having a predetermined frequency. According to several embodiments, the AC voltage generator 110 generates and amplifies a pulse width modulated signal with a frequency of 60 Hz in order to generate the output AC voltage of 24 VAC at 60 Hz.

According to several embodiments, water flow control devices controlled by irrigation controllers are configured to use a power supply of 24 VAC at or around either 50 Hz or 60 Hz, depending on the electricity standard of the country where the irrigation controller is being used. In one embodiment, the input AC voltage signal 102 received at the power supply 104 is 210 VAC at 51 Hz and, accordingly, the output AC voltage 116 generated by method 200 is substantially equal to 24 VAC at 50 Hz. Additionally, if the input AC voltage signal 102 received at the power supply 104 varies over time from 210 to 230 VAC and 51 to 49 Hz, the AC voltage generator 110 generates the output AC voltage 116 to be substantially equal to 24 VAC at 50 Hz.

Furthermore, the power supply 104 according to the embodiment above is also configured to receive an input AC voltage of 115 VAC at 60 Hz, and in turn, the generated output AC voltage 116 is substantially equal to 24 VAC at 60 Hz. Thus, as described above, the power supply 104 is configured to convert the input AC voltage signal 102 having a voltage level ranging from 85 to 260 VAC and a frequency level around 50 Hz or 60 Hz. Further details are provided below in regards to the performance of steps 202 and 204.

Figure 3:
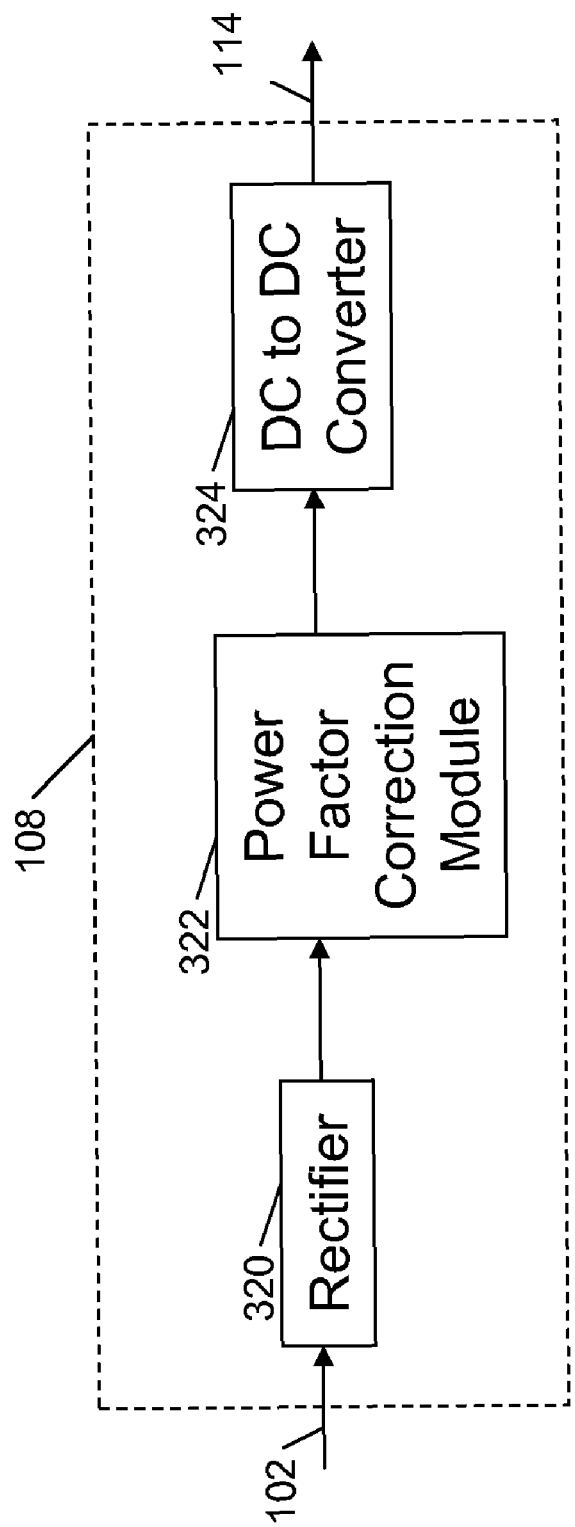
FIG. 3 is a block diagram of an AC to DC voltage converter according to one embodiment of FIG. 1.

Referring next to FIG. 3, a block diagram of an AC to DC voltage converter according to one embodiment of FIG. 1 is illustrated. The AC to DC voltage converter 108 includes a rectifier 320, a power factor correction module 322 and a DC to DC converter 324.

As illustrated, an input AC voltage signal 102 is coupled to the input of the rectifier 320, and the output of the rectifier 320 is coupled to the input of the power factor correction module 322. The output of the power factor correction module 322 is coupled to the DC to DC converter 324, and the DC to DC converter outputs a DC voltage signal 114.

The rectifier 320 at least rectifies the input AC voltage signal 102 to create a DC voltage signal 114 using, for example, a diode bridge. In some variations, the rectifier 320 also includes an electromagnetic interference (EMI) filter in addition to a diode bridge in order to rectify and filter the input AC voltage signal 102 to create a DC voltage signal 114.

As is generally understood, when designing power supplies, specific governmental regulations require the power supply to comply with a variety of safety and quality standards. For example, in a system comprising small enclosure size and switch mode circuitry, compliance of governmental standards for radiated and conducted electromagnetic interference (EMI) presents one of the more significant challenges. Some compliance standards require the EMI radiation to be below a predetermined threshold. However, the regulations imposed on power supplies differ depending on the amount of power being supplied. In some embodiments, the power supply 104 described in FIG. 1 is configured to supply less than 70 watts (W) of power, and accordingly, the radiation requirements are less stringent. However, in some embodiments, additional benefits may be achieved by reducing radiation emitted from the power supply 104 even though not required for compliance to government standards.

Thus, FIG. 3 depicts the input AC voltage 102 being rectified by the rectifier 320 and passed to the power factor correction module 322. The power factor correction module 322 corrects the power factor of the input circuitry to improve efficiency. In some embodiments, the power factor correction module 322 also includes circuitry to suppress emissions. In other embodiments, no power factor correction module 322 is provided and the DC voltage having been rectified is supplied directly to the DC to DC converter 324.

Although power factor correction (PFC) may not be mandatory when supplying 70 W or less, in some embodiments, the power factor correction module 322 is incorporated into the AC voltage converter 112. Incorporating PFC, in such embodiments, provides additional benefits, such as simplifying the input AC voltage signal 102 circuitry, improving utilization of AC mains circuits, reducing distortion and noise on AC mains, simplifying design and reducing the size of DC to DC converter 324, and requiring less storage capacitance to reduce power-on surges. In some embodiments, the power factor correction module 322 is a single stage power factor controller, which accordingly, provides a good compromise between size, cost, complexity and efficiency factors. It is understood that the term AC mains refers to the source of the input AC voltage signal 102.

In some variations, the power factor correction module 322 is an average-current-feedback boost converter that supplies a direct current to the DC to DC converter 324. In some embodiments, the DC to DC converter 324 also provides safety isolation and bears most of the burden of the regulation. Considerations such as size, weight, thermal levels and efficiency may influence the choice of using a switch mode power supply for the AC to DC conversion circuitry. Additionally, in some embodiments, the pre-regulation provided by the power factor correction module 322 permits the use of smaller magnetic components in the DC to DC converter 324. Furthermore, in some embodiments, the power factor correction module 322 also benefits the efficiency of the power supply 104 wherein the DC to DC converter 324 provides power to the AC voltage generator 110 shown in FIG. 1.

Figure 4:
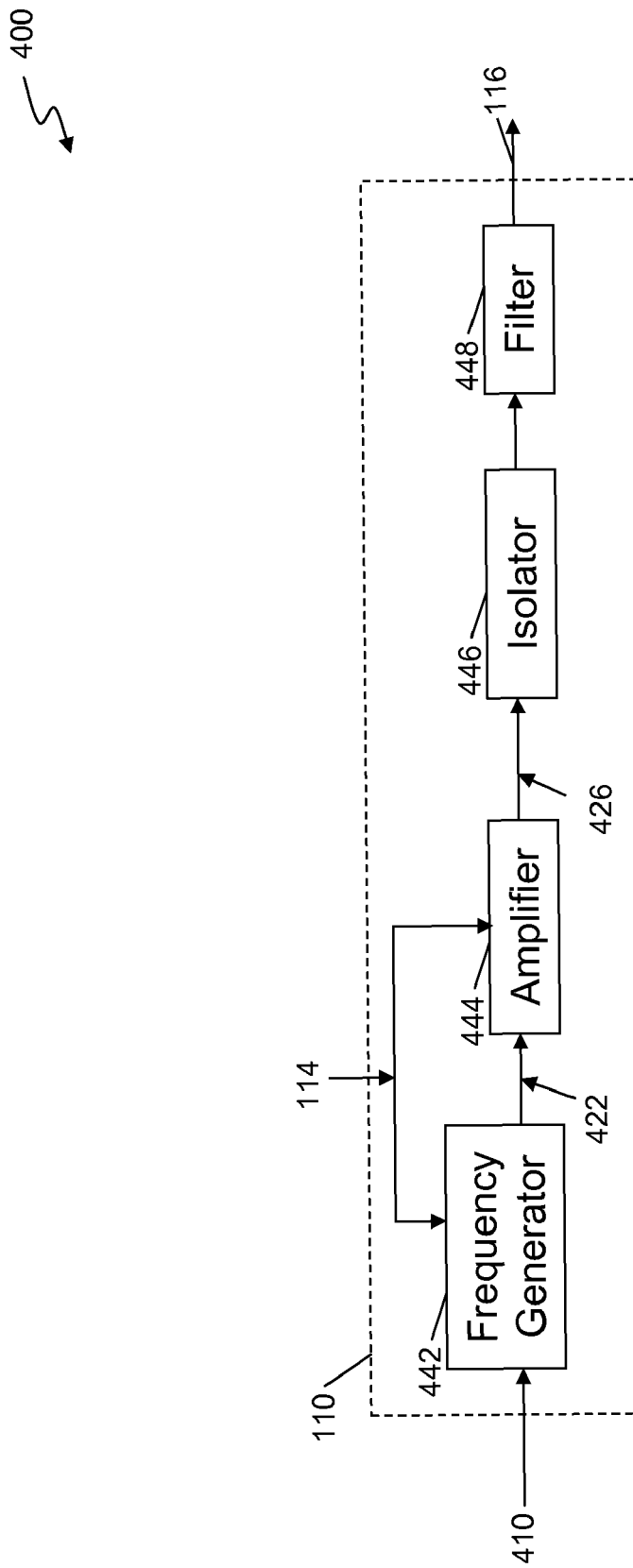
FIG. 4 is a block diagram of an AC voltage generator according to one embodiment of FIG. 1.

Referring next to FIG. 4, a block diagram of an AC voltage generator according to one embodiment of FIG. 1 is illustrated. The AC voltage generator 110 includes a frequency generator 442, an amplifier 444, an isolator 446 and a filter 448. The AC voltage generator 110 is configured to receive a frequency signal 410 and a DC voltage signal 114 in order to provide an output AC voltage 116 for use by an irrigation controller.

According to several embodiments, the frequency generator 442 dictates the frequency of the output AC voltage 116, which, in some embodiments, corresponds to the frequency signal 410. Additionally, in some embodiments, the frequency signal 410 is a signal that corresponds to the frequency of the input AC voltage signal 102 (as shown at least in FIGS. 1-3). In some embodiments, the frequency signal 410 is only an indication when the input AC voltage signal 102 is stable enough for the AC voltage generator 110 to begin generating the output AC voltage 116. According to several embodiments, the DC voltage signal 114 supplies operational power to the frequency generator 442. In some embodiments, the DC voltage signal 114 is supplied to the frequency generator 442 to indicate whether or not the power supply is in a stable operation.

Accordingly, the frequency generator 442 generates a periodic signal 422 using the frequency signal 410, and the periodic signal 422 is supplied to the amplifier 444. The amplifier 444 in turn uses the DC voltage signal 114 to amplify the periodic signal 422 to generate an amplified signal 426. According to some embodiments, the amplified signal 426 is the output AC voltage 116. That is, in some embodiments, the AC voltage generator 110 uses only the frequency generator 442 and the amplifier 444 to generate the output AC voltage 116. According to several embodiments, the AC voltage generator 110 also includes an isolator 446 and a filter 448. Thus, the amplified signal 426 is optionally passed through the isolator 446 and/or the filter 448 prior to providing the output AC voltage 116 for use by an irrigation controller.

In one embodiment, the frequency signal 410 is from a crystal generating a fixed frequency signal, and the frequency generator 442 is a digital clock configured to output a periodic signal 422 at substantially the fixed frequency. In other embodiments, the frequency signal 410 is a combination of clock signals and/or a signal generated from a detection module (e.g., a zero-crossing detector, discussed in further detail below) that detects the frequency of the input AC voltage signal 102. Thus, according to some embodiments, the frequency signal 410 indicates, to the frequency generator 442, at which frequency to generate the periodic signal 422. In several embodiments, the frequency generator 442 is a configurable pulse width modulator (PWM) and/or a microcontroller configured to output a controlled periodic signal 422, such as a pulse width modulated signal or a sine wave at a frequency dictated by the frequency signal 410.

According to several embodiments, the frequency generator 442 outputs a pulse width modulated signal that corresponds to the frequency signal 410 and/or the input AC voltage signal 102. For example, in one embodiment, the input AC voltage signal 102 has a frequency at or around 50 Hz±5% and thus the frequency signal 410 is a pulse signal (e.g., a rising edge of a digital signal) occurring every 0.02 seconds (1/50 Hz). Accordingly, the frequency generator 442 uses this frequency signal 410 to generate a periodic signal 422 with a frequency substantially equal to 50 Hz.

Alternatively or additionally, in one embodiment, the input AC voltage signal 102 has a frequency at or around 60 Hz±5%, and the frequency signal 410 is a pulse signal occurring every 0.0167 seconds. Thus, the frequency generator 442 generates a periodic signal 422 with a frequency substantially equal to 60 Hz. As described above, the periodic signal 422 is supplied to the amplifier 444 for amplification.

According to several embodiments, the amplifier 444 is a digital amplifier, e.g., a class D amplifier. In some embodiments, the amplifier 444 is digitally controlled by the frequency generator 442. The amplifier 444 produces an amplified signal 426 which, in some embodiments, is the output AC voltage 116. In other embodiments, the amplified signal 426 is first passed through the isolator 446 prior to generating the output AC voltage 116.

In some embodiments, the isolator 446 provides protection to the AC voltage generator 110 should a load be incorrectly coupled to the output of the AC voltage generator 110. And, in some embodiments, the amplified signal 426 is, additionally and/or alternatively, passed through the filter 448 prior to generating the output AC voltage 116. The filter 448, in some embodiments, provides a reduction in overall electromagnetic emissions by the power supply 104, and may additionally provide a cleaner/sharper output AC voltage 116 to the irrigation controller.

Figure 5:
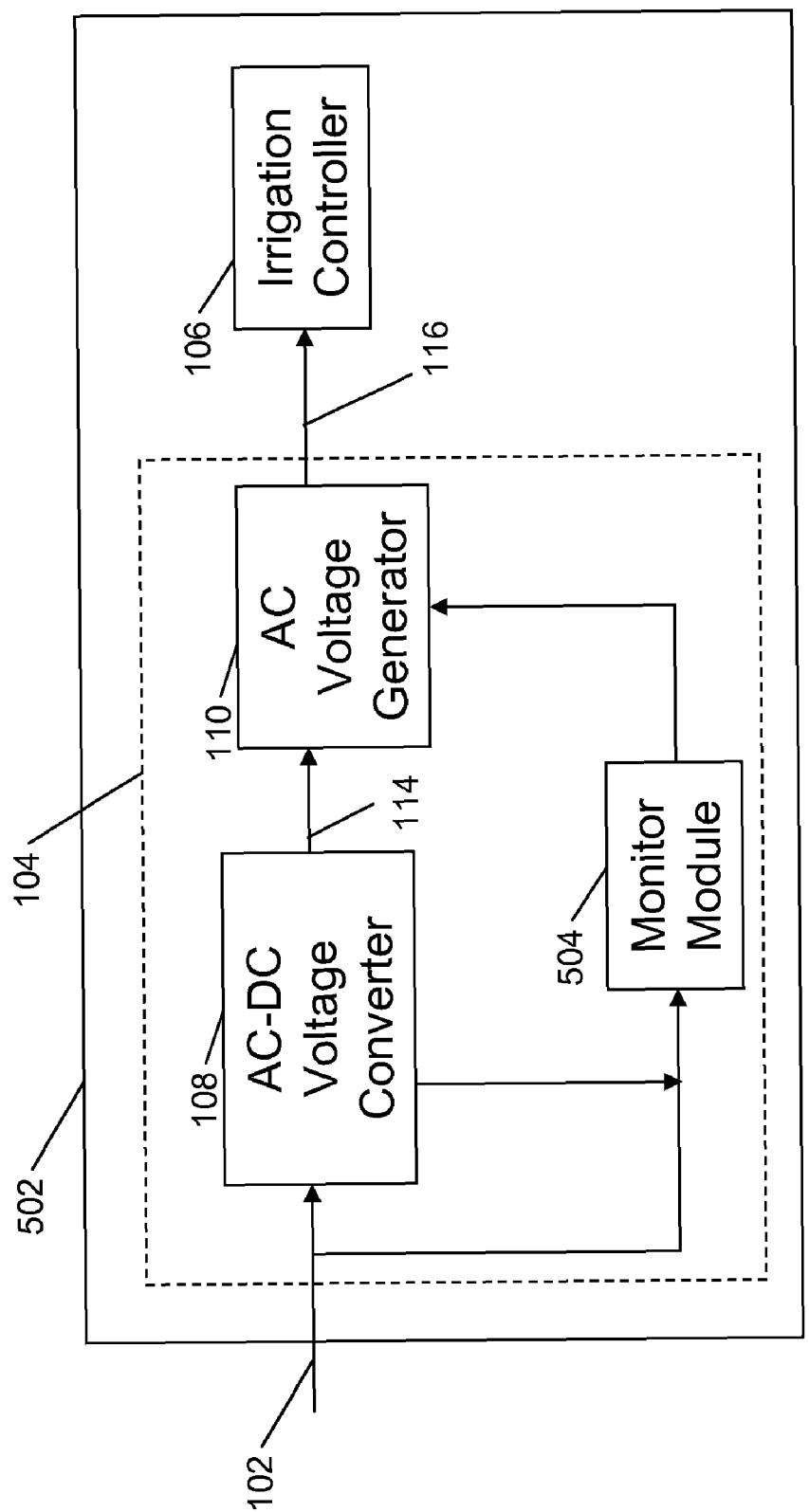
FIG. 5 is a block diagram of a power supply for providing power for use by an irrigation controller according to one embodiment.

Referring next to FIG. 5, a block diagram of a power supply according to one embodiment of FIG. 1 is illustrated. An irrigation device enclosure 502 includes a power supply 104 and the irrigation controller 106. The power supply 104 includes an AC to DC voltage converter 108, an AC voltage generator 110 and a monitor module 504.

According to several embodiments, the input AC voltage signal 102 is supplied to the power supply 104 and directed to the AC to DC voltage converter 108 and the monitor module 504. In some embodiments, the monitor module 504 is also coupled to the AC to DC voltage converter 108 and/or the AC voltage generator 110. As described in reference to FIG. 1, the AC to DC voltage converter 108 is coupled to the AC voltage generator 110, and, the AC voltage generator 110 generates the output AC voltage 116 for use by the irrigation controller 106 and/or other attached devices.

As shown in FIG. 5, the power supply 104 and the irrigation controller 106 are located within the irrigation device enclosure 502. Alternatively, in some embodiments, the power supply 104, or any components thereof, e.g., the AC to DC voltage converter 108, the AC voltage generator 110, and/or the monitor module 504, are external to, or located outside of the irrigation device enclosure 502.

According to several embodiments, the monitor module 504 monitors the power supply 104 for specific operating conditions. In some embodiments, the monitor module 504 monitors the AC-DC voltage converter 108 and/or the AC input voltage 102 to detect unstable operating conditions. In some embodiments, the monitoring module 504 is configured to cause the AC voltage generator 110 to cease generating the output AC voltage 116 upon detecting an unstable operating condition. According to some embodiments, upon detecting an unstable operating condition, the monitor module 504 disables the amplifier 444 of the AC voltage generator 110 as shown in FIG. 4. In some embodiments, the monitoring module 504 is configured to cause the AC-DC voltage converter to cease producing the DC voltage output 114 upon detecting an unstable operating condition. As is generally understood, an unstable operating condition may occur when there is a surge of current supplied to the irrigation device enclosure 502 (e.g., across input terminals of the irrigation device enclosure 502, not shown) and/or detected within the power supply 104 (e.g., detecting an unstable current output from the AC to DC voltage converter 108.) An unstable operating condition includes AC input voltage 102 being too high or low or the frequency of AC input voltage 102 being too high or low. Other unstable operating conditions include excessive current consumption, also known as overload, in the AC voltage generator 110 or irrigation controller 116.

Figure 6:
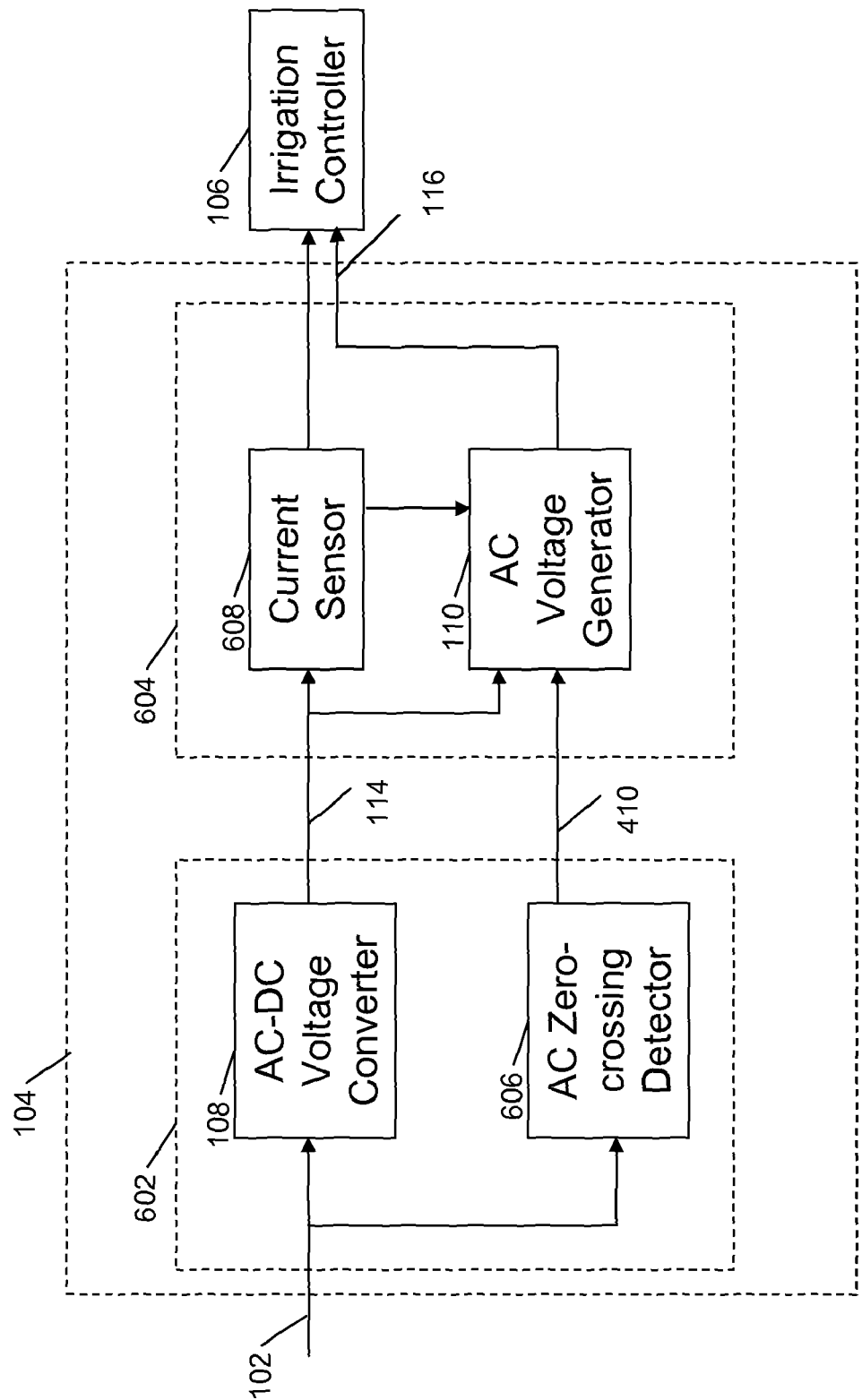
FIG. 6 is a block diagram of a power supply for providing power for use by an irrigation controller according to one embodiment.

Referring next to FIG. 6, a block diagram of a power supply according to one embodiment of FIG. 5 is illustrated. A power supply 104, including a front end board 602 and a back end board 604, is illustrated for providing power for use by an irrigation controller 106. The front end board 602 includes the AC to DC voltage converter 108 and an AC zero-crossing detector 606. The back end board 604 includes a current sensor 608 and the AC voltage generator 110.

According to several embodiments, an input AC voltage signal 102 is supplied to the front end board 602. The input AC voltage signal 102 is directed to the AC to DC voltage converter 108 and the AC zero-crossing detector 606. As described above, the AC to DC voltage converter 108 receives the input AC voltage signal 102 and converts it to a DC voltage signal 114 by, for example, rectifying and filtering the input AC voltage signal 102. The front end board 602 is coupled to the back end board 604, wherein the DC voltage signal 114 is supplied to the current sensor 606 and the AC voltage generator 110.

In some embodiments, the AC zero-crossing detector 606 is used to determine the frequency of the input AC voltage signal 102 by analyzing the input AC voltage signal 102 to detect when the voltage level crosses zero volts (discussed in further detail below). In some embodiments, the AC zero-crossing detector 606 supplies a frequency signal 410 to the AC voltage generator 110, as shown in FIG. 4, to indicate at which frequency the output AC voltage 116 should be generated. The current sensor 608 is also coupled to the AC voltage generator 110 and to the irrigation controller 106. In some embodiments, the AC zero-crossing detector 606 and/or the current sensor 608 are examples of the monitor module 504 shown in FIG. 5.

In some embodiments, when the voltage and/or current of a power source is unstable for a certain amount of initial cycles (e.g., an initial three cycles), the voltage and current at the initial power on cycles may exceed and/or fall below a limit that will harm or destroy components of the power supply 104 and/or irrigation controller 106. Thus, in some embodiments, the frequency signal 410 also indicates to the AC voltage generator 110 when the input AC voltage 102 has reached a stable operating condition, for example, the voltage level has crossed zero volts at least six times. Additionally, in some embodiments, the current sensor 608 monitors the current and/or voltage level of the DC voltage signal 114, and notifies the AC voltage generator 110 when it has reached a predetermined level. Once the AC voltage generator 110 has received proper indication via the AC zero-crossing detector 606 or the current sensor 608, the AC voltage generator 110 will start generating the output AC voltage 116.

According to several embodiments, the current sensor 608 is used to detect unstable operating conditions after the AC voltage generator 110 has begun generating the output AC voltage 116. In some embodiments, the current sensor 608 analyzes the DC voltage signal 116 to determine when the voltage level and current level exceeds and/or falls below a predetermined threshold. For example, unstable voltage could be an input of less than 85 volts or more than 260 volts. In another example, the current threshold could be a maximum level, such as 5 amperes. In some embodiments, the current sensor 608 detects a power source input current level. In some embodiments, the current sensor 608 determines if an improper load has been coupled to, or in place of, the irrigation controller 106. For example, when an improper voltage is coupled to the output of the back end board 604, the current sensor 608 detects a problem and shuts down the AC voltage generator 110 and/or causes it to cease generating the output AC voltage 116.

According to some embodiments, the AC zero-crossing detector 606 is located on the back end board 604; and, alternatively or additionally, the current sensor 608 is located on the front end board 602. Thus, systems presented depict example configurations, however, one skilled in the art may implement a different configuration depending on size and/or space considerations. It is understood that the front end board 602 and the back end board 604 are provided by way of example. In some embodiments, all components are located on one board.

Figure 7:
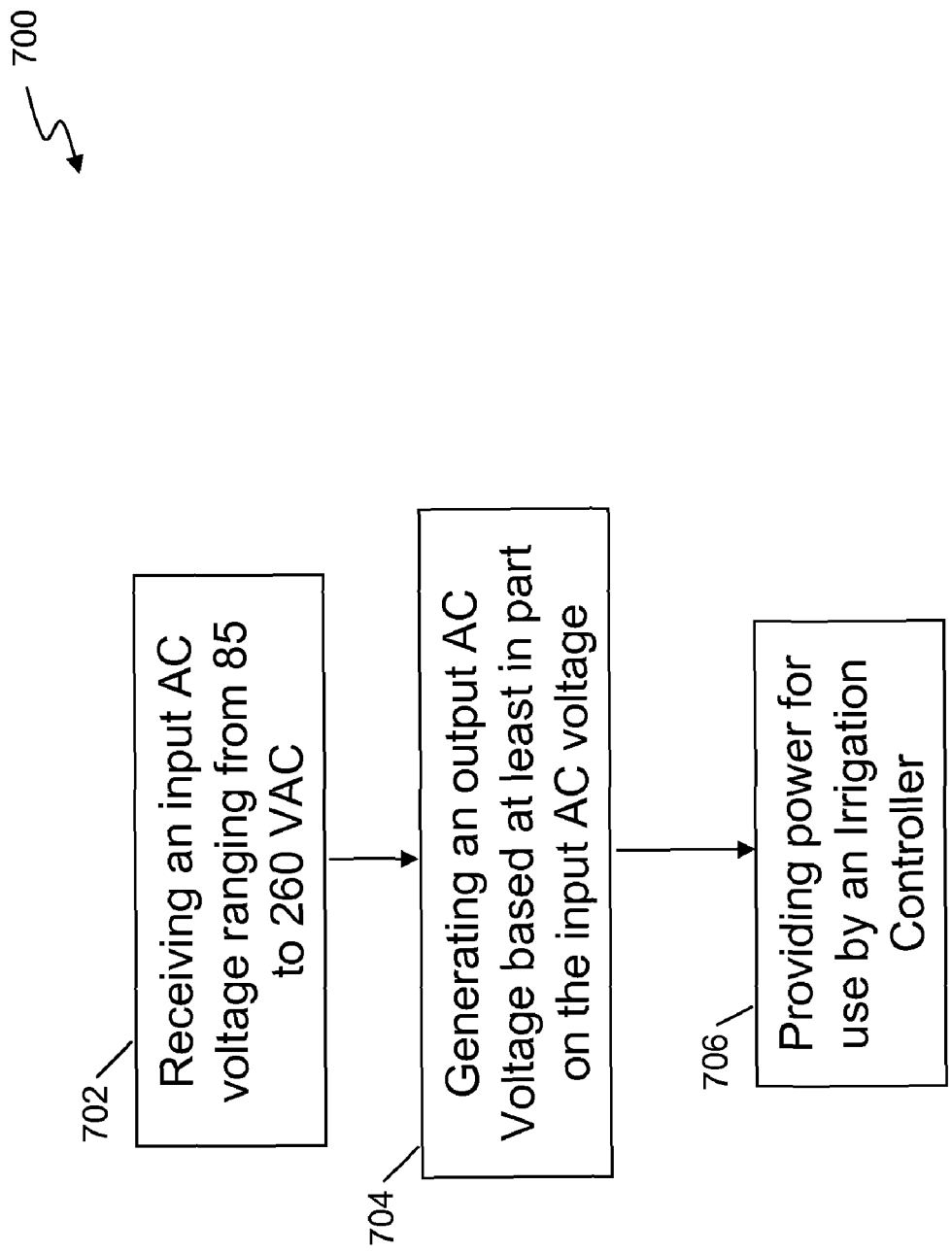
FIG. 7 is a flow diagram of the steps performed in a method of providing power for use by an irrigation controller according to one embodiment.

Referring next to FIG. 7, a flow diagram is shown of the steps performed in a method of providing power for use by an irrigation controller according to another embodiment. In one embodiment, the method 700 begins by receiving an input AC voltage ranging from 85 to 260 VAC (step 702).

In one embodiment, the AC to DC voltage converter 108 of the power supply 104 of FIG. 1 is configured to receive an input AC voltage 102 ranging from 85 to 260 VAC. The AC to DC voltage converter 108 is also configured convert the input AC voltage 102 ranging from 85 to 260 VAC to a DC voltage signal 114.

Next, the method 700 continues with generating an output AC voltage based at least in part on the received input AC voltage (step 704). For example, the power supply 104 of FIG. 1 directs the DC voltage signal 114, having been converted from the 85 to 260 VAC, to the AC voltage generator 110 to generate the output AC voltage 116. The method 700 continues with providing power for use by an irrigation controller (step 706). Thus, the power supply 104 of FIG. 1 is configured to couple to an irrigation controller 106, and the AC voltage generator 110 supplies the 24 VAC to the irrigation controller.

In some embodiments, the power supply 104 implementing the method 700 may be used universally to receive any AC power source providing an input AC voltage ranging from 85 to 260 VAC at 50 or 60 Hz. By way of example, in one embodiment, the input AC voltage 102 having been received is 120 VAC that varies over time from 115 to 125, and has a frequency of 60 Hz. As shown in method 700, the power supply 104 generates an output AC voltage 116 of 24 VAC at 60 Hz. Thus, although the input AC voltage 102 is used to generate the output AC voltage 116, the output AC voltage 116 is not dependent on the variations of the input AC voltage 102.

Thus, unlike a traditional step down transformer based power supply, the power supply 104 generates a stable output AC voltage 116 regardless of variations in the input AC voltage 102. Additionally, in a traditional step down power supply the circuitry required to receive a universal input from 85 to 260 VAC requires very expensive and bulky components as compared to required to implement the steps of a switching power supply such as method 700.

According to several embodiments, using method 700, the power supply 104 is also configured to generate a substantially constant output AC voltage 116 to the irrigation controller 106 with a frequency based on the frequency of the input AC voltage 102. However, the frequency of the output AC voltage 116, although based on the input AC voltage 102, does not follow the variations in frequency because the AC voltage generator 110 shown FIG. 1 subsequently generates the frequency at a substantially constant rate. In some embodiments, the power supply 104 generates the output AC voltage 116 to have a frequency being one of 50 Hz when a the input AC voltage frequency is within a first frequency range (e.g., less than 54.5 Hz) and 60 Hz when the frequency of the input AC voltage is within a second frequency range (e.g., 54.5 Hz or higher).

Figure 8:
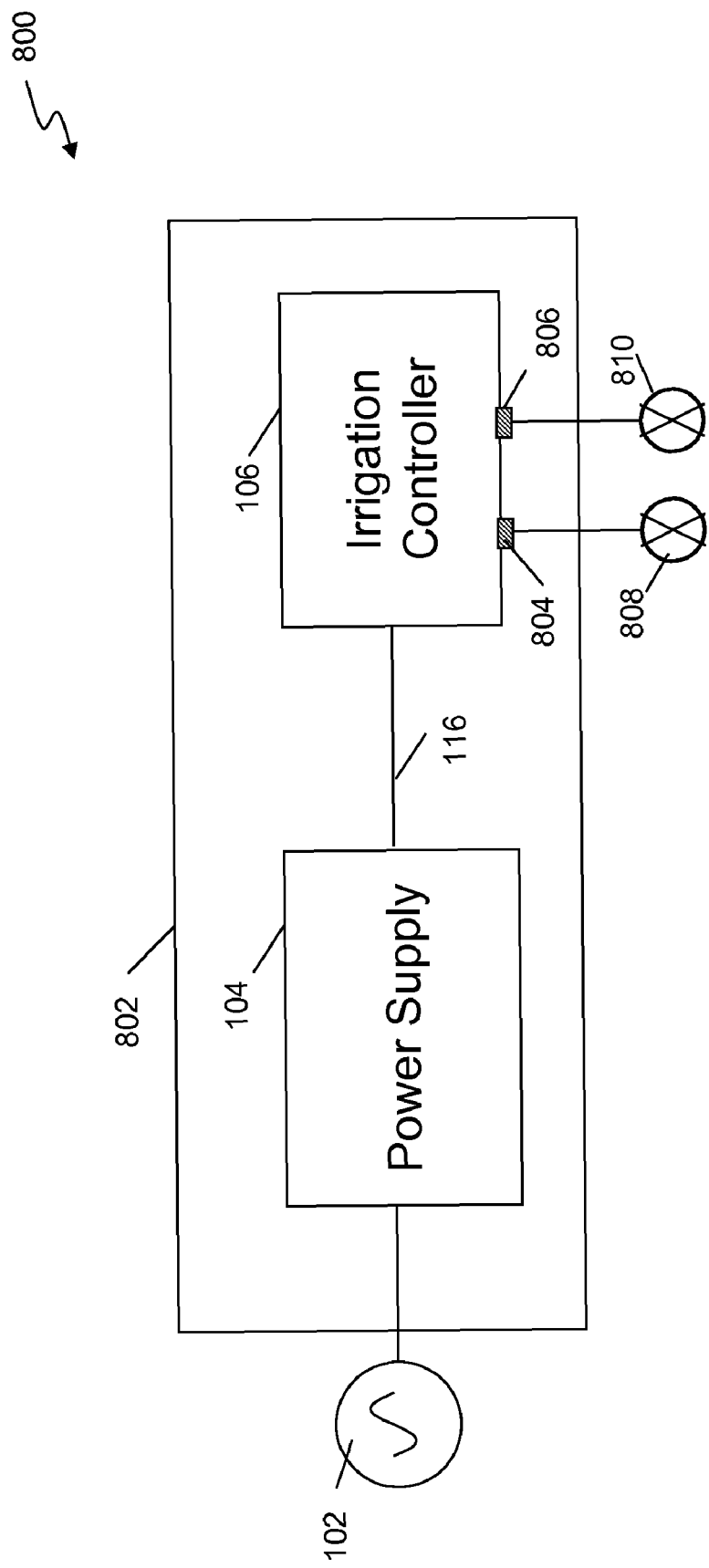
FIG. 8 is a block diagram of a power supply for providing power for use by an irrigation controller according to one embodiment.

Referring next to FIG. 8, a block diagram of a power supply for providing power for use by an irrigation controller according to another embodiment is illustrated. An irrigation controller housing 802 includes a power supply 104 coupled to an irrigation controller 106. The irrigation controller includes a plurality of control output terminals 804 and 806. According to several embodiments, the control output terminals 804 and 806 are coupled to a plurality of water flow control devices 808 and 810, e.g., solenoid actuated valve terminals, located outside of the irrigation controller housing 802. In other embodiments, the power supply 104 is located outside the irrigation controller housing 802 and is further coupled to the irrigation controller 106 via wires or cables.

According to several embodiments, the input AC voltage signal 102 is supplied to the power supply 104, wherein the input AC voltage signal 102 is converted to a DC voltage signal. The DC voltage signal 114 is used at least in part to generate an output AC voltage 116 for use by the irrigation controller 106. In some embodiments, the DC voltage signal 114 is also supplied directly to the irrigation controller 106. Additionally and/or alternatively, the output AC voltage 116 is used by the irrigation controller 106, e.g., switched to the appropriate output terminal/s 804, 806 to actuate the appropriate water flow control devices 808 and 810 to provide watering according to a stored watering schedule. In some embodiments, the power supply 104 may provide power for use by control devices controlling low voltage devices other than water flow control devices, such as, lighting control devices, pool pump control devices, etc.

Figure 9:
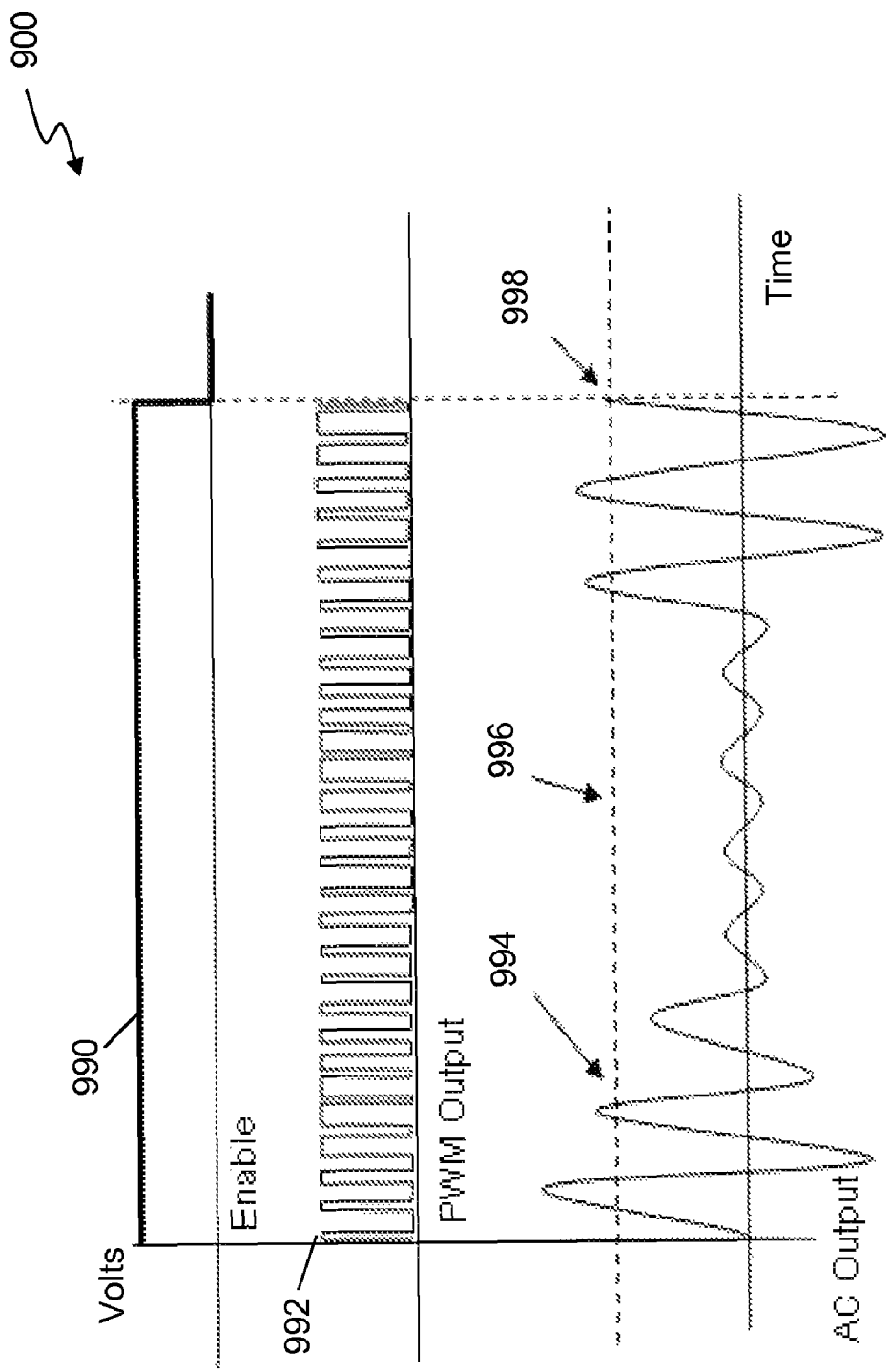
FIG. 9 is a diagram illustrating various waveforms to show the detection of unstable operating conditions according to one embodiment.

Referring next to FIG. 9, a diagram illustrating various waveforms to show the detection of unstable operating conditions according to one embodiment is illustrated. According to several embodiments, an over current detection implementation is illustrated with an enable signal 990, a pulse width modulated (PWM) output signal 992 and an AC output signal 994.

By way of example, in one embodiment, the enable signal 990 is high, e.g., a digital 1, when the system is in a stable operating condition. In this case, the enable signal 990 is low, e.g., a digital 0, when the system is in an unstable operating condition. Thus, in some embodiments, referring back to FIG. 4, the frequency generator 442 continues to generate a periodic signal, as illustrated by the PWM output signal 992, as long as the enable signal 990 remains high. In some embodiments, the enable signal 990 indicates to the amplifier 444 that the system is operating in a stable condition, and therefore, the amplifier 444 continues amplifying the periodic signal 422 generated by the frequency generator 442.

In one embodiment, referring back to FIG. 5, the monitor module 504 detects when the AC output signal 994 exceeds the threshold 996 for three consecutive cycles. Thus, when the AC output signal 994 exceeds the threshold 996 for only two consecutive cycles, the AC voltage generator 442 continues generating the output AC voltage 116 shown in the AC output signal 994. As is generally understood, when a power source is initially turned on, there is a normal in rush of energy. Thus, after only two cycles, the power supply 104 recognizes the AC output signal 994 is higher than normal due to the in rush of energy.

Typically the high in rush of energy will settle down after the third cycle. However, when the AC output signal 994 exceeds the threshold 996 for three consecutive cycles, the power supply 104 recognizes this as an unstable operating condition. In some embodiments, at this point, e.g., a disable point 998, the monitor module 504 pulls the enable signal 990 low. A low enable signal 990 disables the AC voltage generator 110 and the power supply 104 ceases generating the output AC voltage 116; as seen by the termination of AC output signal 994. In some variations, the enable signal 990 enables the AC voltage generator 110 comprising the frequency generator 442 and amplifier 444. For example, referring back to FIGS. 5 and 6, the monitor module 504, such as a current sensor 608 and/or a AC zero-crossing detector 606, detects when the output AC voltage 116 has exceeded a voltage and/or current threshold 996 and supplies the enable signal 990 only upon detecting a stable operating condition.

Figure 10:
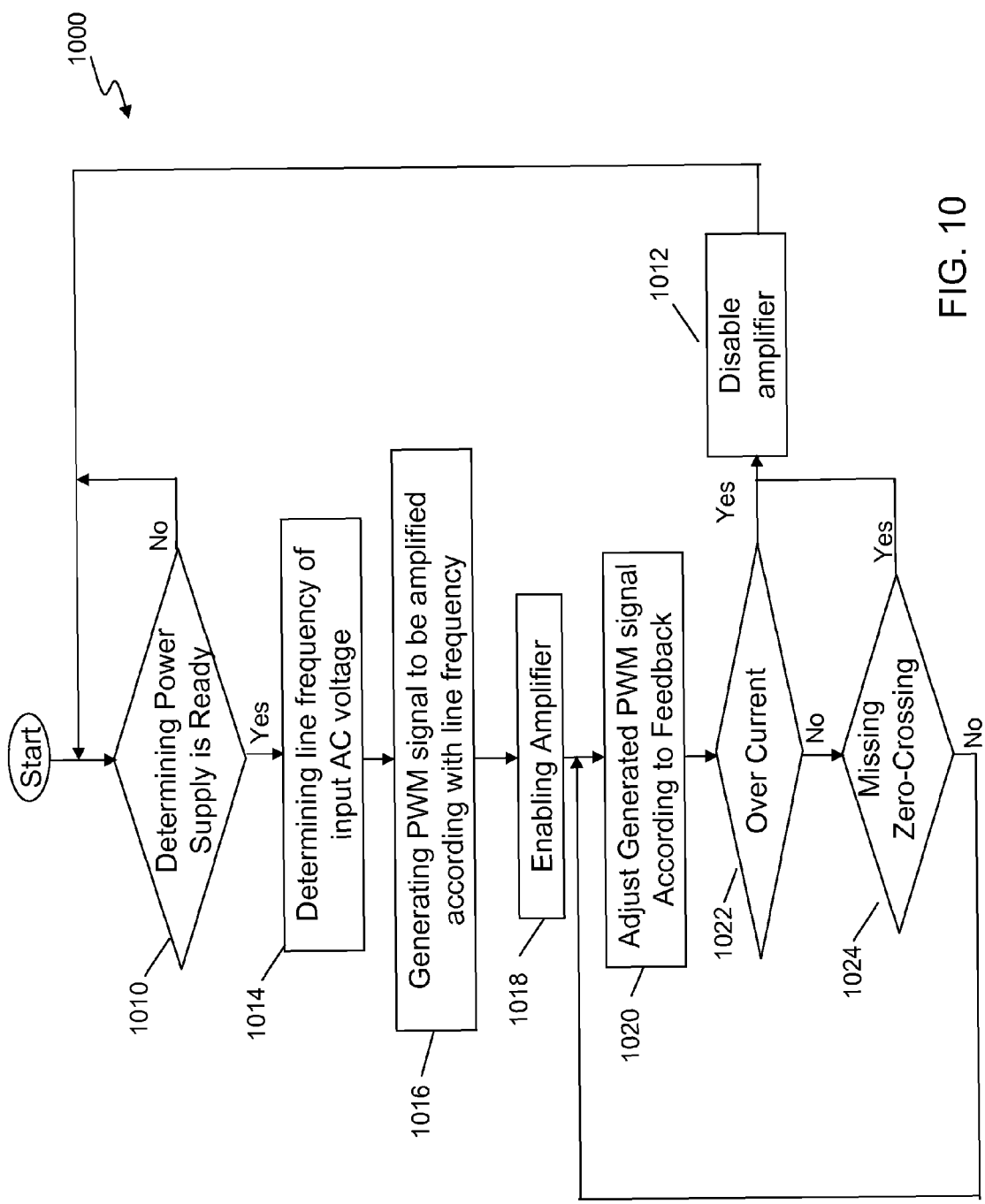
FIG. 10 is a flow diagram of the steps performed in a method of providing power for use by an irrigation controller according to one embodiment.

Referring next to FIG. 10, a flow diagram of the steps performed in a method of providing power for use by an irrigation controller according to one embodiment. Method 1000 begins with determining if the power supply is ready to begin generating power (step 1010). In some embodiments, as shown in FIG. 6, the determination is made by the current sensor 608 that the power supply 104 is ready by monitoring the DC voltage signal 114. The current sensor 608 monitors the DC voltage signal 114, having been converted from AC to DC voltage converter 108, to determine when the DC voltage signal 114 exceeds a pre-determined voltage threshold.

Additionally and/or alternatively, the determination is made by the AC zero-crossing detector 606 that the power supply 104 is ready by detecting a pre-defined number of consecutive zero-crossings by the input AC voltage 102. As discussed above, often when a voltage is applied, during the initial coupling there may be a surge on voltage or current, wherein attempting to convert the high voltage may damage or destroy components of and/or attached to the power supply 104. Thus, if the power supply 104 delays generating a voltage and/or amplifying a signal, for at least the first few cycles after powering on, then the power supply 104 may avoid damaging components. Thus, in some embodiments, determining the power supply 104 is ready is determined by counting, for example, three zero-crossings by the input AC voltage 102.

Accordingly, when determining the power supply is not ready to begin generating power, the power amplifier remains disabled. In some embodiments, the monitor module 504, the current sensor 608 or the AC zero-crossing detector 606 detects that the power supply 104 is in an unstable operating condition, and thus, sends a disable signal to, for example, the amplifier 444 of FIG. 4 until the power supply 104 is ready.

Next the method continues with determining a line frequency of the input AC voltage based on the AC zero-crossing signal (step 1014). In some embodiments, the determination of the line frequency is made by the AC zero-crossing detector 606. In this case, the input AC voltage 102 is supplied to the AC zero-crossing detector 606, wherein the time between zero crossings of the input AC voltage 102 is recognized by the AC zero-crossing detector 606 converted into a frequency signal 410. In some embodiments, the AC voltage generator 110 may receive zero-crossing signals from the AC zero-crossing detector 606; wherein, any method known to one skilled in the art may be used to determine the frequency of the input AC voltage using the zero-crossing signals (e.g., using a half cycle, a full cycle and/or an average of multiple cycles). Thus, in some variations, the output AC voltage 116 frequency is dependent on the line frequency of the input AC voltage, for example, wherein the output AC voltage 116 frequency is chosen to be 50 Hz when the input AC voltage frequency is less than 54 Hz, and is chosen to be 60 Hz when the input AC voltage frequency is greater than or equal to 54 Hz.

The method continues with generating a PWM signal to be amplified according with the line frequency (step 1016). The PWM signal is a series of pulses, the width of which is modulated to create an AC signal at the frequency of the line. In some embodiments, the AC voltage generator 110 generates the PWM signal to be amplified according with the line frequency. In some variations, the PWM signal is generated based on a table. The table may be stored in the AC voltage generator 110, for example, and the frequency generator of the AC voltage generator 110 generates the PWM signal by retrieving duty cycle values from a table at a rate of the determined line frequency.

Next, method 1000 continues with enabling the amplifier (step 1018). According to several embodiments, the AC voltage generator 110 of FIG. 4 enables the amplifier 444 to begin amplifying the generated PWM signal. In some embodiments, the method 1000 optionally continues with adjusting the generated PWM signal according to feedback (step 1020). The feedback may be from the output signal 116 applied to the irrigation controller 106. By way of example, the AC signal may be maintained at a relatively constant 24 VAC and relatively free of distortion. This constancy and lack of distortion can be maintained despite variations in the load (i.e., electrical needs of the irrigation controller 106). In this case, the AC voltage generator 110 adjusts the generated PWM signal according to feedback received.

Next, method 1000 continues with determining if there is an over current (step 1022). And, if an over current is detected, the amplifier is disabled (step 1012). In some embodiments, the current sensor 608 is configured to continually monitor the current, and upon detecting an over current, notifies the AC voltage generator 110 to disable the amplifier 444. Additionally and/or alternatively, method 1000 provides for determining if there is a missing of a zero crossing (step 1024). According to some embodiments, the AC zero-crossing detector 606 continually monitors the input AC voltage zero-crossings, wherein upon detecting a predefined number of missed zero crossings, the AC voltage generator 110 disables the amplifier 444.

Figure 11:
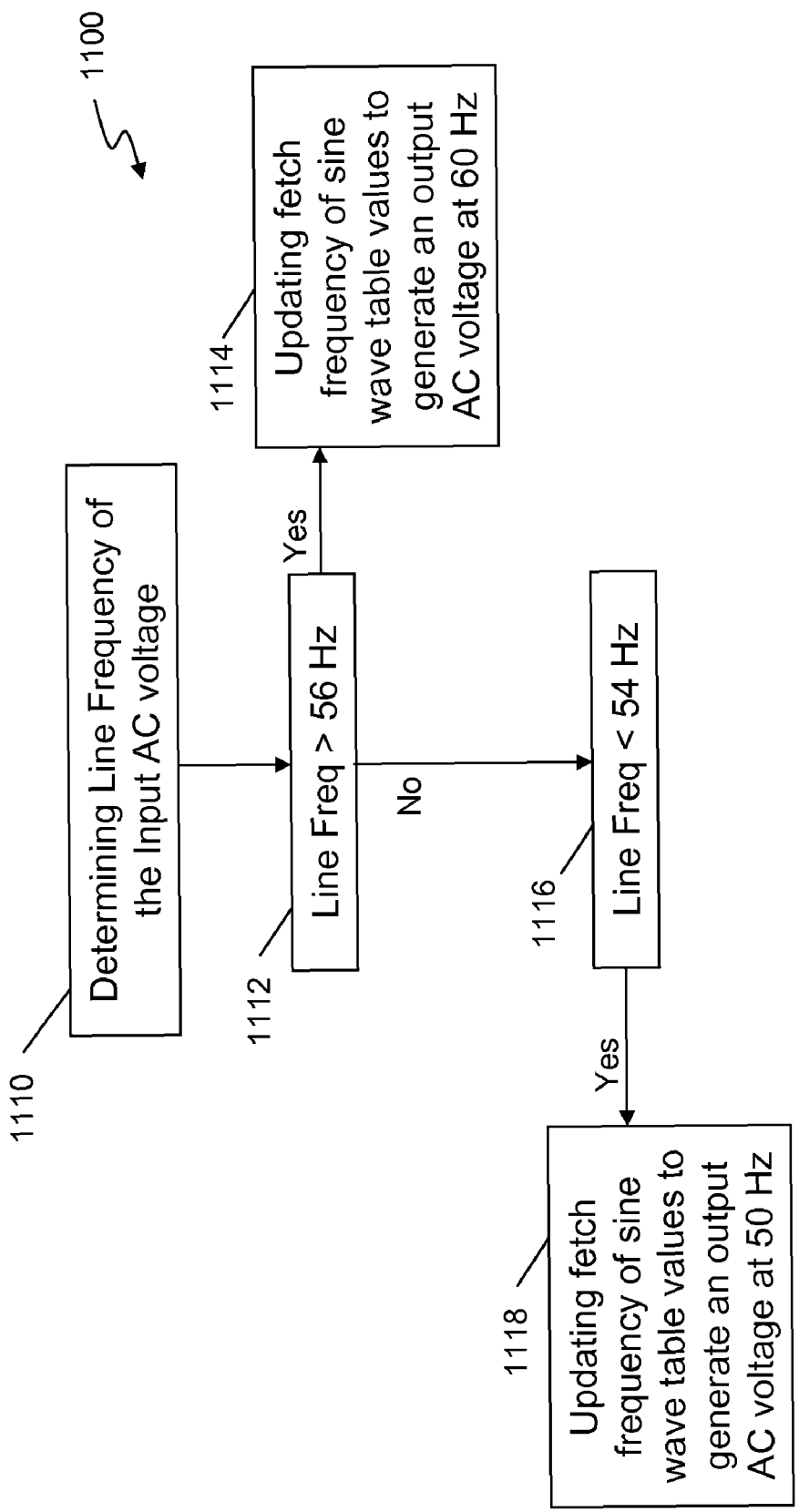
FIG. 11 is flow diagram of the steps performed in a start-up method for providing power for use by an irrigation controller according to one embodiment.

Referring next to FIG. 11, a flow diagram of the steps performed in a start-up method for providing power for use by an irrigation controller according to one embodiment. Method 1100 begins with determining the line frequency of the input AC voltage (step 1110). As described above, in some embodiments, the input AC voltage 102 is supplied to the AC zero-crossing detector in order to determine the frequency of the input AC voltage 102. Next, the method 1100 continues with determining if the line frequency is above 56 Hz (step 1112). As described above in reference to FIG. 10, the AC voltage generator 110 may generate the PWM signal to be amplified based on a table stored within the AC voltage generator 110. In some variations, the table comprises data points of a sine wave, wherein the data points of the sine wave are fetched at a predetermined frequency in order to generate the PWM signal to be amplified. In the case that the line frequency is greater than 56 Hz, then method 1100 continues with updating the fetch frequency of the sine wave table values to generate an output AC voltage at 60 Hz. If the line frequency is not greater than 56 Hz, then method 1100 continues to determine if the line frequency is less than 54 Hz (step 1116). If the line frequency is less than 54 Hz, then method 1100 continues with updating the fetch frequency of the sine wave table values to generate an output AC voltage at 50 Hz (step 1118).

In other variations, the AC voltage generator may be configured to generate the output AC voltage 116 to be one of 50 Hertz (Hz) when a frequency of the input AC voltage is within a first frequency range and 60 Hz when the frequency of the input AC voltage is within a second frequency range. For example, the first frequency range may be below 55 Hz and the second frequency range may be 55 Hz and higher; or, for example, the first frequency range may be 47 to 54 Hz, and the second frequency range may be 56 to 63 Hz.

Figure 12:
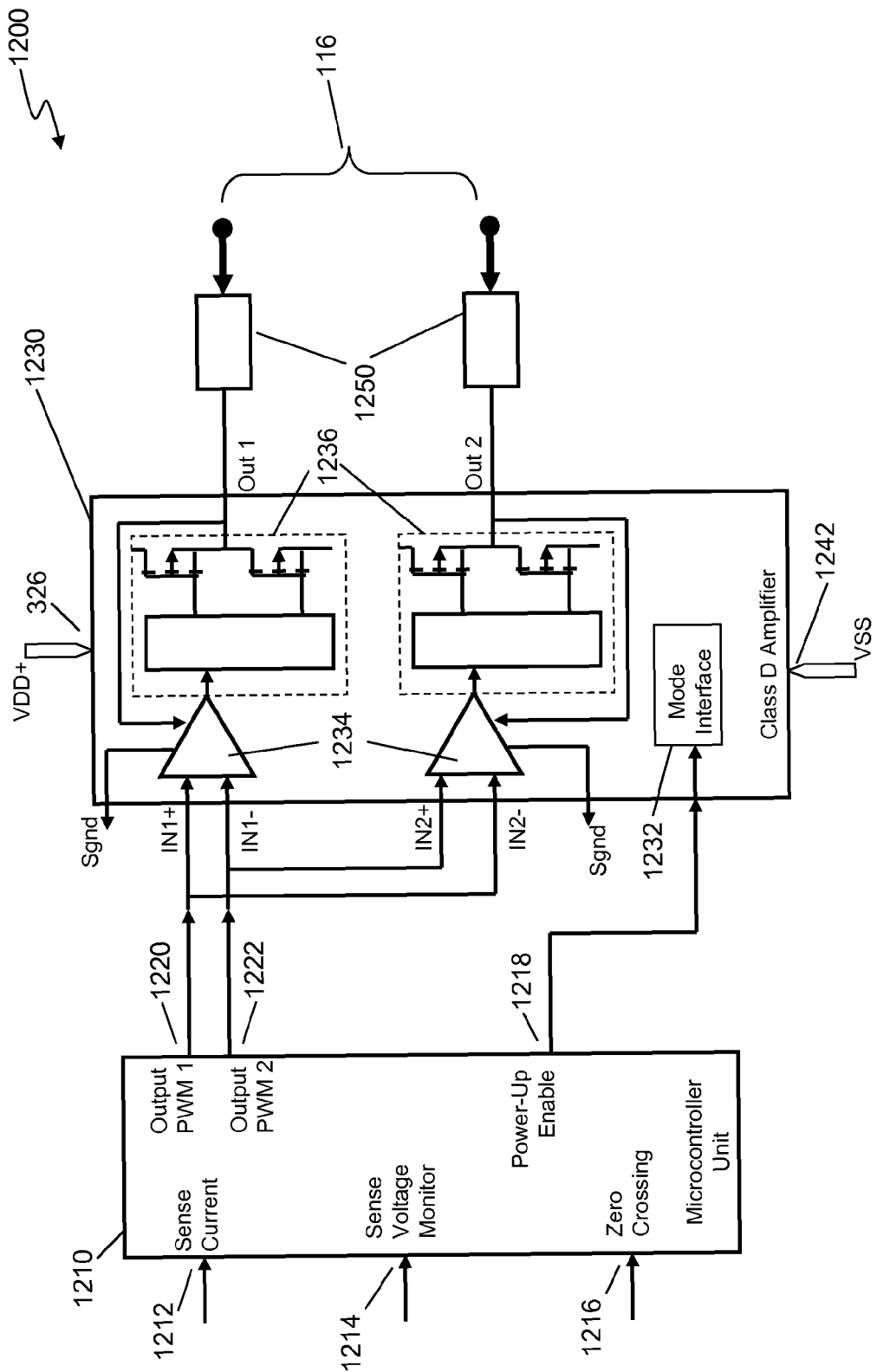
FIG. 12 is a block diagram of components of the AC voltage generator according to one embodiment.

Referring next to FIG. 12 a block diagram of components of the AC voltage generator according to one embodiment is illustrated. The system 1200 comprises a microcontroller unit 1210, a class D amplifier 1230 (generically referred to as a power amplifier 1230) and output AC voltage 116 load terminals 1250.

The system 1200, in some embodiments, may represent the AC voltage generator as discussed in reference to FIGS. 1-11 above. According to several embodiments, the microcontroller unit 1210 includes a current sense input 1212, a sense voltage monitor 1214, and a zero-crossing input 1216. The microcontroller unit 1210 further includes a power-up and/or enable output 1218, a first PWM output 1220, in some embodiments, a second PWM output 1222. The class D amplifier 1230 includes digital inputs for a mode interface 1232 and a plurality of comparators/inverters 1234, and analog outputs from a plurality of bridges 1236.

The first PWM output 1220 of the microcontroller unit 1210 is supplied to one set of inputs, e.g., in1+ and IN2−, of the plurality of comparators 1234 of the class D amplifier 1230; and the second PWM output 1222 is supplied to the other set of inputs, e.g., in1− an IN2+, of the plurality of comparators 1234. The power-up and/or enable output 1218 of the microcontroller unit 1210 is supplied to the mode interface 1232 of the class D amplifier 1230. Additionally, a positive voltage VDD+ 1240 and a negative voltage VSS are supplied to the class D amplifier 1230. The output plurality of comparators 1234 are coupled to the plurality of bridges 1236, wherein the outputs of the bridges 1236 are fed back to the comparators 1234 in addition to supplying an output AC voltage 116 to the output AC voltage load terminals 1250.

According to several embodiments, implementing an amplifier, such as the class D amplifier 1230, takes advantage of this highly integrated solution for benefits such as cost savings and reduced EMI. By way of example, the full bridge output structure of the class D amplifier 1230 provides approximately 4 times more output power than the typical amplifier, and, is thus highly efficient. Additionally, the full-bridge output structure of the class D amplifier 1230 is fully differential, which provides additional EMI advantages. Therefore, the class D amplifier provides benefits of reduced size, cost and higher power efficiency, making it an attractive choice for the power supply 104.

By way of example, the amplifier chosen for the power supply 104 may comprise the following characteristics: analog or digital inputs, provisions for negative feedback, consequent power supply rejection ratio specifications, integrated or external output MOSFETS, distortion reduction scheme and implementation, output protection scheme and implementation, output efficiency, high availability of complements and reduced electromagnetic interference generation.

In some variations in the present embodiment, the microcontroller unit 1210 may comprise analog to digital converter. The analog to digital converter may be used, for example, to sample the input AC voltage to measure the time between the zero crossings. This measurement may be used to obtain the input frequency of the input AC voltage, and thus, output a PWM signal based on the input frequency. Additionally and/or alternatively, the analog to digital converter may be used to sample the power supply 104's output AC voltage and determine if the power amplifier may be enabled. Further, the analog digital converter may be used to sample and measure the output current in order to adjust the PWM output signal.

Now referring additionally to FIGS. 5 and 6, the current sense input 1202, sense voltage monitor 1204 in the zero crossing input 1206 may each and input to an analog to digital converter in the microcontroller unit 1210. The current sense input 1202 may receive a current, and/or a current signal from the monitor module 504 and/or current sensor 608. In some variations, the microcontroller unit 1210 will monitor the output current, and, if at the load passes a predefined maximum threshold a predefined number of times, the microcontroller unit 1210 will shut down the class D amplifier 1230 by sending a disabled signal. By way of example, if the load current is detected to pass an over current limit three cycles in a row, the microcontroller unit 1210 will determine this to be an unstable operating condition and will disable the amplifier. When an inductive load is powered for the first time, it produces an inrush current for two cycles; wherein, in the present embodiment, this over current would not shut down the amplifier because it does not exceed over current limit three times in a row.

Similarly, the sense voltage monitor 1204 may receive a voltage, and/or voltage level signal from the monitor module 504 and/or the current sensor 608. In some embodiments, the current sense input 1202 and the sense voltage monitor 1204 may indicate to the microcontroller unit 1210 that the power supply 104 is ready to begin generating an output AC voltage. In some variations, this indication may occur when the current sense input 1202 and the sense voltage monitor 1204 are each within a predefined threshold, indicating to the microcontroller unit 1210 that the AC to DC voltage converter has generated a sufficient voltage for the class D amplifier to begin amplifying in the load current is within a stable operating condition.

This zero-crossing input 1206 may be supplied, for example, by the monitor module 504 and/or the zero-crossing detector 622. The zero-crossing input 1206 may comprise a signal and/or a pulse for every instance the AC input voltage passes zero volts, for example. Additionally and/or alternatively, the zero-crossing input 1206 may comprise a signal indicating to the microcontroller unit 1210 the frequency of the input AC voltage. Additionally, the zero-crossing input 1206 may indicate to the microcontroller unit 1210 that the input AC voltage has missed crossing zero volts. In this case, if the input AC voltage has missed crossing zero volts a predetermined number of times, the microcontroller unit 1210 may determine the input AC voltage is unstable and, thus, cause the AC voltage generator to cease generating the output AC voltage.

In some variations in the present embodiment, the microcontroller unit 1210 may determine from their current sense input 1202, a sense voltage monitor 1204 and zero crossing input 1206 at the power supply 104 is ready to begin generating an output AC voltage. The microcontroller unit 1210 may synchronize with the input AC voltage by waiting for the next zero crossing of the input AC voltage. Additionally, the microcontroller unit 1210 may samples the sense voltage monitor 1204 to determine that the DC voltage having been converted by the AC to DC voltage converter has reached a predefine voltage, and thus, the amplifier may be enabled. After this determination has been made, the microcontroller unit 1210 may send a power-up and/or enable signal to the mode interface 1232 class D amplifier 1230. Additionally, the microcontroller unit 1210 may receive and/or determine the frequency of the input AC voltage via the zero crossing input 1206, wherein the frequency determines which PWM signal will be generated.

In some variations, the microcontroller unit 1210 may store in memory a plurality of tables comprising values for generating PWM signals, wherein one of the plurality of tables is chosen depending on the frequency of the input AC voltage. For example, the tables may contain the duty cycles for the PWM output to form a sine wave. In some variations, the table may comprise the duty cycles for the PWM outputs to form only one quarter of a sine wave. Wherein, the values for one quarter of a sine wave are used by the microcontroller unit 1210 to generate the rest of the values for the entire sine wave. Accordingly, the microcontroller unit 1210 will generate the first output PWM signal 1220 and the second output PWM signal 1222 by fetching the table values from memory at a constant rate, wherein the rate varies depending on the input frequency of the input AC voltage.

The class D amplifier 1230, being digitally controlled, may be configured to amplify a periodic signal. Accordingly, the first output PWM signal 1220 and the second output PWM signal 1222 received from the microcontroller 1210 are amplified using the plurality of comparators 1234 and the plurality of bridges 1236 in the class D amplifier. In some embodiments, the class D amplifier may provide efficiency of up to 87% over the full frequency range, wherein amplifier is well-suited to dynamic power limiting without loss of efficiency. The external clock input and logic control of operational mode of the class D amplifier, in some embodiments, make it easily to integrate into a microprocessor controlled system. For example, on-chip remote start up sequencing, self-testing and output protection features well-suited for such a system. Additionally, the class D amplifier offers a fully integrated pair of amplifiers per integrated circuit for a simple implementation of the full-bridge configuration. The silicon-on-insulator configuration of the class D amplifier permits a high clock rate and zero "dead time" switching, resulting in low distortion, and a high cutoff frequency in view of the small filter component size; and, thus provides reduced sensitivity to load impedance variations. The integrated output protection scheme provides a fast response f needed to prevent output failures in the damage.

Figure 13:
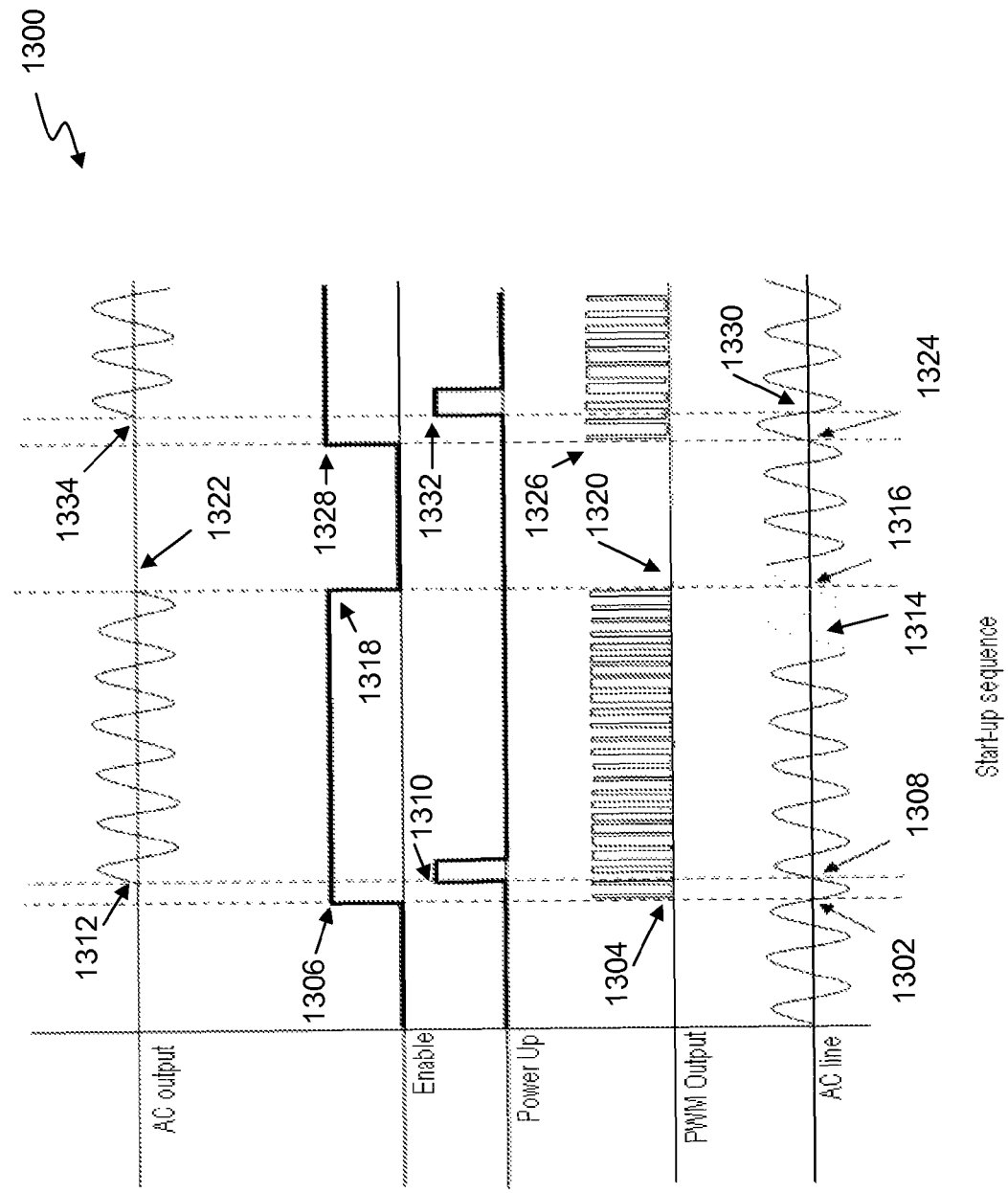
FIG. 13 is a diagram illustrating various waveforms and steps performed to determine a frequency for an output voltage for use by an irrigation controller according to one embodiment.

Referring next to FIG. 13, a diagram illustrating various waveforms and steps performed to determine a frequency for an output voltage for use by an irrigation controller according to one embodiment. The waveforms depicted are an input AC voltage line signal, the PWM output signal, a power-up signal, and enable signal, and an output AC voltage signal. Referring additionally to FIGS. 10-12, in order for the microcontroller unit 1210 to start generating PWM signal, the microcontroller unit 1210 synchronizes with the input AC voltage by waiting for the input AC voltage line to cross zero volts 1302. The microcontroller unit 1210 then begins generating the PWM output 1304 and pulls the enable signal line high 1306. At the next zero-crossing of the input AC voltage line signal 1308, the microcontroller unit 1210 generates a power-up pulse 1310. Accordingly, the power amplifier 1230 is enabled and begins amplifying the PWM output signal to generate the output AC voltage 1312.

The power supply 104 will continue to generate the output AC voltage, however, the microcontroller unit 1210 will continue to monitor his zero-crossing the input AC voltage line, and detect when the input AC voltage misses a zero-crossing 1314. In some embodiments, the power supply 104 will incorporate shutdown mechanics, for example, and upon detecting a predefined maximum allowable missed zero-crossings, the power supply 104 will gracefully shutdown. By way of example, in one embodiment upon detecting three missed zero-crossings 1316, the microcontroller unit 1210 pulls the enable signal low 1318 and ceases generating the PWM output signal 1320. Accordingly, the amplifier is disabled and ceases generating the output AC voltage 1322.

In some embodiments, the microcontroller unit 1210 is configured to wait for a predefined number of zero-crossings 1324, e.g., six zero-crossings, to return to generating the PWM output signal 1114 and pulling the enable signal high 1328. Accordingly, on the next zero-crossing 1330 the power-up signal is sent 1332 thereby enabling the amplifier to return to generating the output AC voltage 1334.

Figure 14:
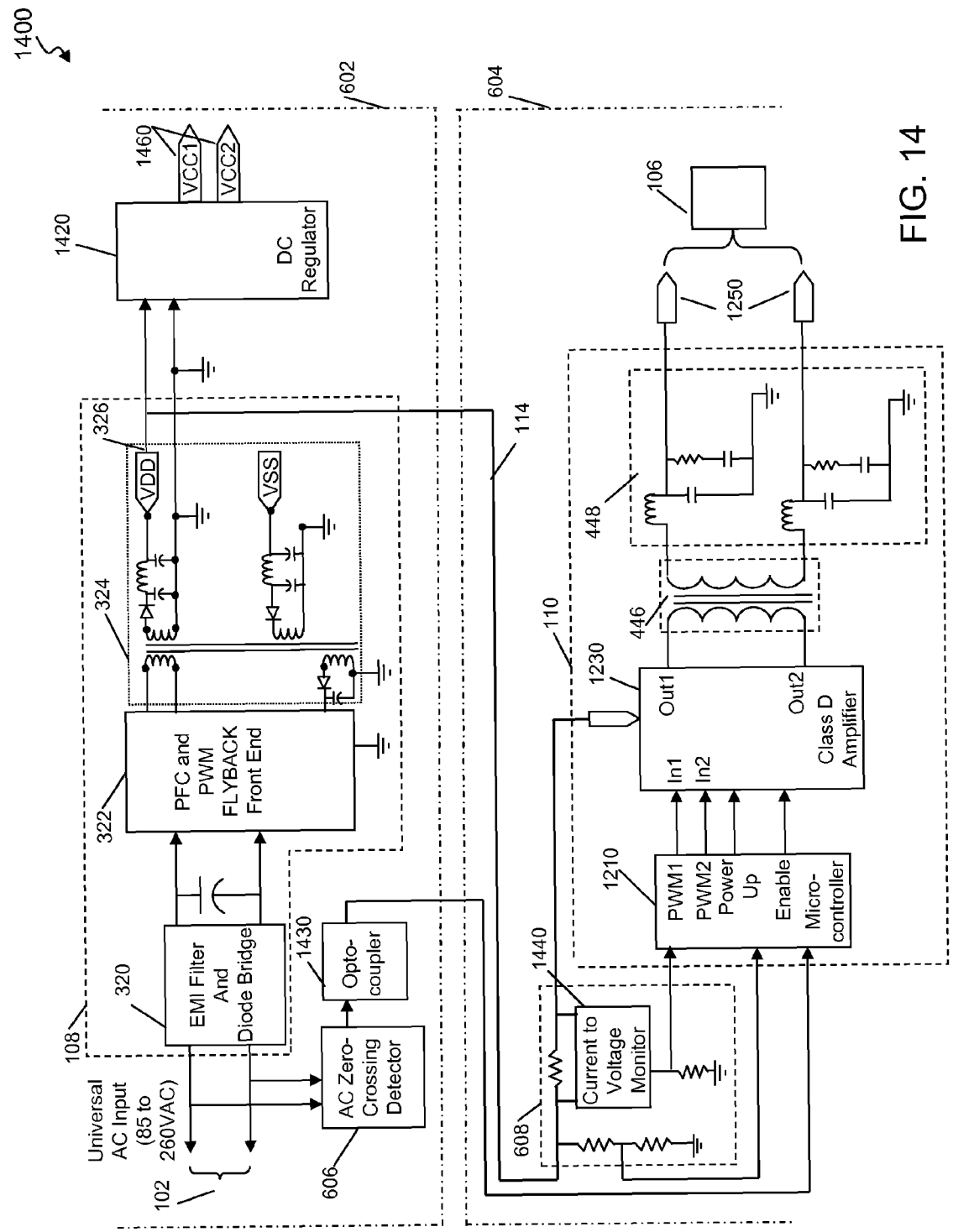
FIG. 14 is a high level circuit diagram illustrating one embodiment of the power supply of FIG. 1.

Referring next to FIG. 14, a high level circuit diagram illustrating one embodiment of the power supply of FIG. 1 according to one embodiment is illustrated. System 1400 illustrates an embodiment comprising the front end board 602 and the back end board 604 as discussed in regards to FIG. 6. The front end board 602 includes the AC to DC voltage converter 108 comprising the rectifier 320, power factor correction module 322 and DC to DC converter 324, as discussed in regards to FIG. 3. In the illustrated embodiment, the rectifier 320 includes an EMI filter and bridge, the power factor correction module 322 includes a PFC and PWM flyback front end, and the DC to DC converter 324 includes a DC to DC switching mode power supply. In some embodiments, the front end board 602 further includes a DC regulator 1420, the AC zero-crossing detector 606 and an opto-coupler 1430.

The back end board 604 includes a current monitor 624 (shown in FIG. 6), comprising a current and voltage monitor 1440; and the AC voltage generator 110 comprising a microcontroller unit 1210 and a class D amplifier 1230, as discussed in regards to FIG. 12, and an isolator 446 and filter 448, as shown in FIG. 4. As illustrated in FIG. 14, an input AC voltage is supplied to the universal AC input terminals 1410 of the front end board 602. In some embodiments, the input AC voltage ranges from 90 to 260 VAC and is supplied to the AC to DC converter adapted to output a DC signal derived from the AC signal.

The input AC voltage 102 is supplied to the rectifier 320 and AC zero-crossing detector 606. The output of the AC zero-crossing detector 606 is supplied to the opto-coupler 1430, and the output of the opto-coupler 1430 is supplied to the microcontroller unit 1210 on the back end board 604. The output of the rectifier 320 is supplied to the power factor correction module 322 prior to being supplied to the DC to DC converter 324. The output DC voltage signal 114, having been converted by the AC to DC voltage converter 108, in addition to being supplied to the back end board 604, is supplied to the DC regulator 1430. In some embodiments, the DC voltage regulator 1430 generates a plurality of DC voltages 1460, e.g., VCC1 and VCC2, for use by one or more components on the power supply 104 and/or to be supplied to the irrigation controller 106.

The output DC voltage signal 114 is supplied to the back end board 604 by the AC to DC converter 108 on the front end board 602. The output DC voltage signal 114 is supplied to the AC voltage generator 110 adapted to generate an output AC voltage signal using the output DC voltage signal 114 signal. Additionally, in some embodiments, a control output is coupled to the AC voltage generator 110, wherein the control output is adapted to couple to an irrigation control device, e.g., the irrigation controller 106; and the control output is further adapted to drive the irrigation control device with the output AC signal.

By way of example, the output DC voltage signal 114, having been converted, is supplied to at least the current sensor 608 and the class D amplifier 1230. In some embodiments, the current sensor 608 determine the DC current of the output DC voltage signal 114, and supply the DC current to the current to voltage monitor 1440. The output of the current to voltage monitor 1440 is fed into the microcontroller unit 1210, as discussed in regards to FIG. 12, in order to shut down the AC voltage generator 110 in case of an overload. In some embodiments, the current monitor 608 also divides the DC current in order to feed the current to the microcontroller unit 1210, as discussed in regards to FIG. 12, to determine if the DC current is within a predetermined range for the stable operation of the power supply 104.

The front end board 602 also supplies the back end board 604 a zero-crossing signal from the opto-coupler 1430. The zero-crossing signal is supplied to the microcontroller unit 1210, as discussed in regards to FIG. 12, in order for the microcontroller unit 1210 to at least synchronize with the input AC voltage. In some embodiments, the zero-crossing signal is also used to determine if a zero-crossing is missed. According to several embodiments, the front end board 602 supplies the plurality of DC voltages 1460, e.g., VCC1 and VCC2, to the back end board 604. For example, at least one of the plurality of DC voltages 1460 is supplied to power at least some of the integrated circuits on the back end board 604, such as, the microcontroller unit 1210, the current to voltage monitor and/or the class D amplifier. In some embodiments, at least one of the plurality of DC voltages 1460, VCC1 and VCC2, are supplied to the irrigation controller 106.

As described above in reference to FIG. 12, in some embodiments, once the input AC voltage is supplied to the universal AC inputs 1410, the microcontroller unit 1210 determines if the power supply 104 is ready to start generating power. Once ready, the microcontroller unit 1210 determines the input frequency of the input AC voltage and synchronizes with the input AC voltage at the next zero-crossing. The microcontroller unit 1210 selects a table corresponding to the input frequency in order to generate PWM signals on the PWM output lines (e.g., 1220 and 1222 in FIG. 12). The microcontroller unit 1210 will then enable the class D amplifier 1230 and send a power-up signal for the class D amplifier 1230 to begin amplifying the PWM signal. After amplifying the PWM signals, the output of the class D amplifier 1230 is passed through the isolator 446 and filtered through filter 448 prior to supplying the output AC voltage to the irrigation controller 106 coupled to the output terminals 1250 (which may be generically referred to as an output).

In some embodiments, the isolator 446 comprises a planar transformer configured to isolate the output of the AC voltage generator, e.g., the output of the class D amplifier 1230, and transform the amplified periodic signal in order to generate the output AC voltage. In some embodiments, the power supply 104 requires the galvanic isolation, which may be achieved with a small transformer than in a traditional step-down power supply. For such embodiments, a planar distribution transformer may be designed with the following characteristics: full power, full bandwidth, 150 Wrms and 20 Hz to 200 Hz. By way of example, in some embodiments this design is implemented with the best available cores and PCB winding techniques to achieve the above performance levels.

The use of switching power supply technology, type D amplifiers, microcontrollers, and power-factor correction are all part of the solution to the above problems. Also, the use of planar transformers will significantly reduce the impact of the cost of copper. Because these technologies depend on the cost of electronic components, there may be a tendency to decrease costs and increase their reliability over time as the components become commodities. Electronic components also increase their functionality and diversify capacities through time; this may promote part consolidation because a generic functional layout may be used for different applications by changing modular components.

In some embodiments, the above topologies for providing power to an irrigation controller are sufficient in systems with high power-on surge currents, and they provide good line regulation, load regulation and brownout tolerance. This allows the class D amplifier 1230 to operate reliably, with an input power source ranging from 85 to 260 volts AC, at 50 or 60 Hz. The power supply 104 may operate at rated power to deliver 26.5 VAC±1 V, at 50 or 60 Hz, depending on the input frequency, and deliver greater than 100 Watts.

Additionally, the above described topologies may be able to cope with a great variety of load characteristics, including overload, short and open circuit conditions. The power supply 104 may be able to deliver full rated power for inductive loads. By way of example, this topology is a viable commercial product because it is able to tolerate a greatest variety of load characteristics and survive fault conditions, without damaging sprinkler solenoids or other inductive loads. Additionally, these products are sold throughout the world, and the above described designs may comply with a great variety of safety and quality standards and certifications for multiple countries.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. It is also noted that any of the components or modules of the various power supplies described herein may each alone or collectively be referred to as a circuit or circuitry.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. An apparatus for providing power to an irrigation controller, comprising: an alternating current (AC) to direct current (DC) voltage converter configured to convert an input AC voltage into a DC voltage;
    an AC voltage generator coupled to the AC to DC voltage converter, the AC voltage generator configured to generate an output AC voltage using the DC voltage; and
    the AC voltage generator coupled to the irrigation controller, the AC voltage generator further configured to supply the output AC voltage to the irrigation controller;
    wherein the AC voltage generator comprises a frequency generator coupled to an amplifier, the amplifier coupled to the voltage converter;
    wherein the frequency generator generates a periodic signal and the amplifier produces the output AC voltage using the DC voltage and the periodic signal.

2. The apparatus of claim 1, wherein the AC to DC voltage converter is further configured to convert the input AC voltage having a voltage level at least within a range between 85 to 260 volts AC.

3. The apparatus of claim 1, further comprising:
    a monitor module coupled to the AC to DC voltage converter and to the AC voltage generator, the monitor module configured to detect an unstable operating condition and cause the AC voltage generator to cease generating the output AC voltage.

4. The apparatus of claim 1, further comprising:
a current sensor coupled to the AC to DC voltage converter, the current sensor configured to detect an input current level.

5. The apparatus of claim 1, further comprising:
a zero-crossing detector coupled to the AC voltage generator, the zero-crossing detector configured to detect when the input AC voltage crosses zero volts.

6. The apparatus of claim 1, wherein the AC voltage generator is further configured to generate the output AC voltage at a substantially constant voltage and a substantially constant frequency when the input AC voltage varies in at least one of frequency and voltage level.

7. The apparatus of claim 1, wherein the AC to DC voltage converter further comprises a power factor correction module.

8. The apparatus of claim 1, wherein
the periodic signal comprises a pulse width modulated signal.

9. The apparatus of claim 8, wherein the frequency generator generates the pulse width modulated signal by retrieving duty cycle values from a table at a rate dependent on the frequency of the input AC voltage.

10. The apparatus of claim 1, wherein the
amplifier is configured to amplify the periodic signal using the DC voltage for generating the output AC voltage.

11. An apparatus for providing power to an irrigation controller, comprising:
an alternating current (AC) to direct current (DC) voltage converter configured to convert an input AC voltage into a DC voltage;
an AC voltage generator coupled to the AC to DC voltage converter, the AC voltage generator configured to generate an output AC voltage using the DC voltage; and
the AC voltage generator coupled to the irrigation controller, the AC voltage generator further configured to supply the output AC voltage to the irrigation controller;
wherein the AC voltage generator further comprises:
an amplifier configured to amplify a periodic signal using the DC voltage for generating the output AC voltage wherein the amplifier further comprises:
a class D amplifier.

12. An apparatus for providing power to an irrigation controller, comprising:
an alternating current (AC) to direct current (DC) voltage converter configured to convert an input AC voltage into a DC voltage;
an AC voltage generator coupled to the AC to DC voltage converter, the AC voltage generator configured to generate an output AC voltage using the DC voltage; and
the AC voltage generator coupled to the irrigation controller, the AC voltage generator further configured to supply the output AC voltage to the irrigation controller;
wherein the AC voltage generator further comprises:
an amplifier configured to amplify a periodic signal using the DC voltage for generating the output AC voltage;
wherein the amplifier is a digitally controlled amplifier coupled to the AC to DC voltage converter, the digitally controlled amplifier configured to amplify the periodic signal when the DC voltage reaches a predefined threshold.

13. An apparatus for providing power to an irrigation controller, comprising:
an alternating current (AC) to direct current (DC) voltage converter configured to convert an input AC voltage into a DC voltage;
an AC voltage generator coupled to the AC to DC voltage converter, the AC voltage generator configured to generate an output AC voltage using the DC voltage; and
the AC voltage generator coupled to the irrigation controller, the AC voltage generator further configured to supply the output AC voltage to the irrigation controller;
wherein the AC voltage generator further comprises:
a planar transformer configured to isolate the output AC voltage and transform a periodic signal used to generate the output AC voltage.

14. The apparatus of claim 1, wherein the output AC voltage is used by the irrigation controller to actuate irrigation control devices.

15. The apparatus of claim 1, wherein the AC voltage generator is further configured to generate the output AC voltage to be one of 50 Hertz (Hz) when a frequency of the input AC voltage is within a first frequency range and 60 Hz when the frequency of the input AC voltage is within a second frequency range.

16. The apparatus of claim 15, wherein the first frequency range is below 55 Hz and the second frequency range is 55 Hz and higher.

17. The apparatus of claim 1, wherein the AC to DC voltage converter and the AC voltage generator are internal to a housing of the irrigation controller.

18. The apparatus of claim 1, wherein the irrigation controller is external to a power supply 104 housing containing the AC to DC voltage converter and the AC voltage generator.

19. A method for powering an irrigation controller comprising:
converting an input alternating current (AC) voltage signal into a direct current (DC) voltage signal;
providing a periodic signal using a frequency generator;
generating an output AC voltage signal using the DC voltage signal, the output voltage signal configured to power the irrigation controller; and
wherein the generating further comprises generating the output AC signal with an amplifier using the DC voltage signal and the periodic signal; and supplying the output AC voltage to the irrigation controller.

20. The method of claim 19, wherein the converting step further comprises:
converting an input AC voltage signal having a voltage level at least within a range between 85 to 260 volts AC.

21. The method of claim 19, further comprising:
monitoring the input AC voltage and the DC voltage signal and ceasing generating the output AC voltage upon detecting an unstable operating condition.

22. The method of claim 19, further comprising:
monitoring a current draw and ceasing generating the output AC voltage when the current draw is above a predefined threshold.

23. The method of claim 19, further comprising: detecting when the input AC voltage signal crosses zero volts.

24. The method of claim 19, wherein the generating step further comprises:
generating a frequency based on a frequency of the input AC voltage signal.

25. The method of claim 19, wherein the generating step further comprises:
generating the output AC voltage signal at a substantially constant voltage and a substantially constant frequency when the input AC voltage varies in at least one of frequency and voltage level.

26. The method of claim 19, wherein the converting step further comprises:

correcting at least one of a frequency of an input AC current and a phase of the input AC current according to a frequency of the input AC voltage and a phase of the input AC voltage.

27. The method of claim 19, wherein the periodic signal comprises a pulse width modulated signal.

28. The method of claim 27, wherein the providing the periodic signal comprises providing the pulse width modulated signal by retrieving duty cycle values from a table at a rate dependent on the frequency of the input AC voltage.

29. The method of claim 19, wherein the generating step further comprises:
amplifying the periodic signal for generating the output AC voltage when the DC voltage reaches a predefined threshold.

30. The method of claim 19, further comprising: actuating irrigating control devices using the output AC voltage having been supplied to the irrigation controller.

31. The method of claim 19, wherein the generating step further comprises:
generating a frequency of the output AC voltage to be one of 50 Hertz (Hz) when a frequency of the input AC voltage is within a first frequency and 60 Hz when the frequency of the input AC voltage is within a second frequency range.

32. The method of claim 31, wherein the first frequency range is below 55 Hz and the second frequency range is 55 Hz and higher.

33. A power supply, comprising:
an input configured to receive an input alternating current (AC) voltage ranging from 85 volts AC to 260 volts AC;
an output configured to couple to an irrigation device;
a circuit configured to generate an output AC voltage; and
a voltage converter coupled to the input configured to convert the input AC voltage to a direct current (DC) voltage;
wherein the circuit comprises a frequency generator coupled to an amplifier, the amplifier coupled to the voltage converter;
wherein the frequency generator generates a periodic signal and the amplifier produces the output AC voltage using the DC voltage and the periodic signal;
wherein the output AC voltage powers the irrigation device and the output AC voltage is substantially constant regardless of whether the input AC voltage varies in at least one of frequency and voltage.

34. The power supply of claim 33, wherein the circuit is further configured to generate a frequency for the output AC voltage to be one of 50 Hz when a frequency of the input AC voltage is within a first frequency range and 60 Hz when the frequency of the input AC voltage is within a second frequency range.

35. The power supply of claim 33 further comprising a monitor coupled to the generator, the monitor configured to disable the amplifier upon detecting an unstable operating condition.

36. A method, comprising:
receiving an input alternating current (AC) voltage having a voltage level ranging between 85 to 260 volts AC; and converting the input AC voltage to a DC voltage; providing a periodic signal using a frequency generator; and generating, based at least in part on the input AC voltage, a substantially constant output AC voltage, configured to be used by an irrigation controller regardless of whether the input AC voltage varies in at least one of frequency and voltage;
wherein the generating further comprises generating the output AC signal with an amplifier using the DC voltage and the periodic signal.

37. The method of claim 36, wherein the providing step further comprises:
providing the periodic signal comprising a pulse width modulated signal by retrieving duty cycle values from a table at a rate dependent on the frequency of the input AC voltage.

38. The method of claim 36, wherein the generating step further comprises:
digitally controlling an amplification of a periodic signal to create the output AC voltage upon detecting the DC voltage is above a predefined threshold.

39. An irrigation controller power supply, comprising:
an input adapted to receive an alternating current (AC) signal;
an AC to direct current (DC) converter coupled to the input, the AC to DC converter adapted to output a DC signal derived from the AC signal;
an AC generator adapted to generate an output AC signal using the DC signal;
a control output coupled to the AC generator, the control output adapted to couple to an irrigation control device; and
the control output further adapted to drive the irrigation control device with the output AC signal;
wherein the AC generator comprises a frequency generator coupled to an amplifier, the amplifier coupled to the voltage converter;
wherein the frequency generator generates a periodic signal and the amplifier produces the output AC voltage using the DC voltage and the periodic signal.

* * * * *